US012639183B2

(12) United States Patent
Oh et al.

(10) Patent No.: US 12,639,183 B2
(45) Date of Patent: May 26, 2026

(54) SIMULATION SYSTEM FOR AUXILIARY POWER SUPPLY IN STORAGE DEVICES

(71) Applicant: SAMSUNG ELECTRONICS CO., LTD., Suwon-si (KR)

(72) Inventors: Jaerim Oh, Suwon-si (KR); Young-Sik Lee, Suwon-si (KR); Jeong-Eun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 18/808,471

(22) Filed: Aug. 19, 2024

(65) Prior Publication Data

US 2025/0147854 A1      May 8, 2025

(30) Foreign Application Priority Data

Nov. 8, 2023      (KR) ........................ 10-2023-0154004

(51) Int. Cl.
| | |
|---|---|
| *G06F 1/30* | (2006.01) |
| *G06F 11/22* | (2006.01) |
| *G06F 11/26* | (2006.01) |

(52) U.S. Cl.
CPC .............. *G06F 11/261* (2013.01); *G06F 1/30* (2013.01); *G06F 11/2273* (2013.01)

(58) Field of Classification Search
CPC ....... G06F 11/262; G06F 1/30; G06F 11/2273
See application file for complete search history.

(56) References Cited

U.S. PATENT DOCUMENTS

| | | | |
|---|---|---|---|
| 7,761,681 | B2 | 7/2010 | Jewell et al. |
| 9,037,882 | B2 | 5/2015 | Vadakkanmaruveedu et al. |
| 10,700,546 | B2 | 6/2020 | Sakuragi et al. |
| 10,996,733 | B2 | 5/2021 | Lee et al. |
| 11,380,407 | B2 | 7/2022 | Yamasaki |
| 11,461,516 | B2 | 10/2022 | Chung |
| 11,656,990 | B2 | 5/2023 | Jeon et al. |
| 2015/0027397 | A1 | 1/2015 | Corbett et al. |
| 2015/0227397 | A1 | 8/2015 | Gogula et al. |
| 2019/0214831 | A1* | 7/2019 | Kristjansson ......... H02J 7/0013 |
| 2021/0191854 | A1* | 6/2021 | Yang ................... G06F 13/1673 |

FOREIGN PATENT DOCUMENTS

CN      115509626 A    12/2022

* cited by examiner

*Primary Examiner* — Keshab R Pandey
(74) *Attorney, Agent, or Firm* — Sughrue Mion, PLLC

(57) ABSTRACT

Provided is a simulation system which includes a storage device including an auxiliary power supply configured to generate an auxiliary power, the storage device being configured to, based on detecting a sudden power-off (SPO) event, perform a power loss protection (PLP) procedure associated with backing up operation data based on the auxiliary power; and a storage simulator including a first simulation central processing unit (CPU) and a second simulation CPU, the storage simulator being configured to, based on detecting the SPO event, perform a PLP simulation corresponding to the PLP procedure, configured to generate a power consumption value by measuring an amount of power consumed while the PLP simulation is performed, and configured to determine a capacity of the auxiliary power supply based on the power consumption value.

20 Claims, 14 Drawing Sheets

Figure 5:
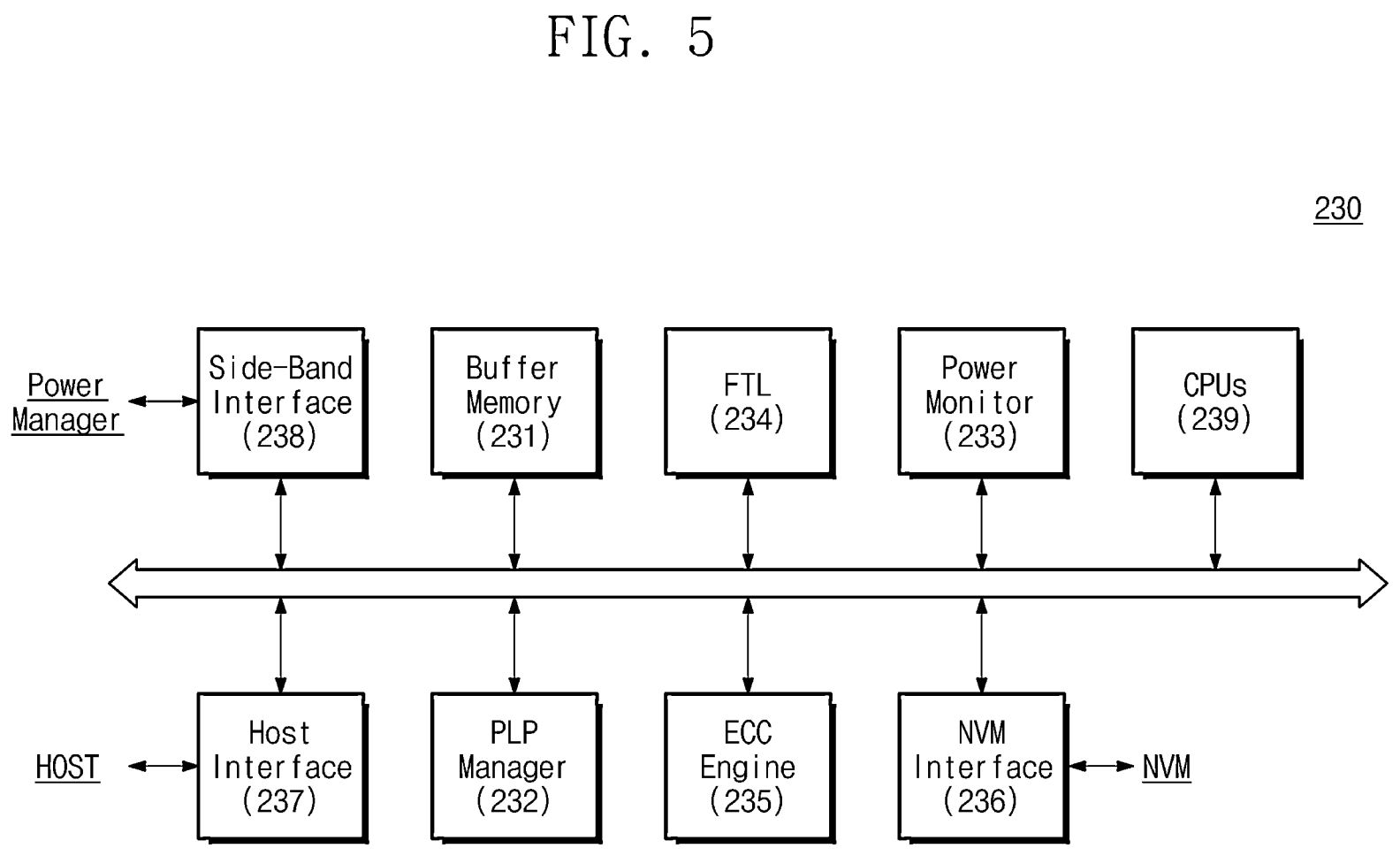

| | |
|---|---|
| Side-Band Interface (238) | Buffer Memory (231) |
| Host Interface (237) | PLP Manager (232) |

CPUs (239)

Power Monitor (233) — NVM Interface (236) — NVM

FTL (234) — ECC Engine (235)

Power Manager

HOST

Figure 11B:
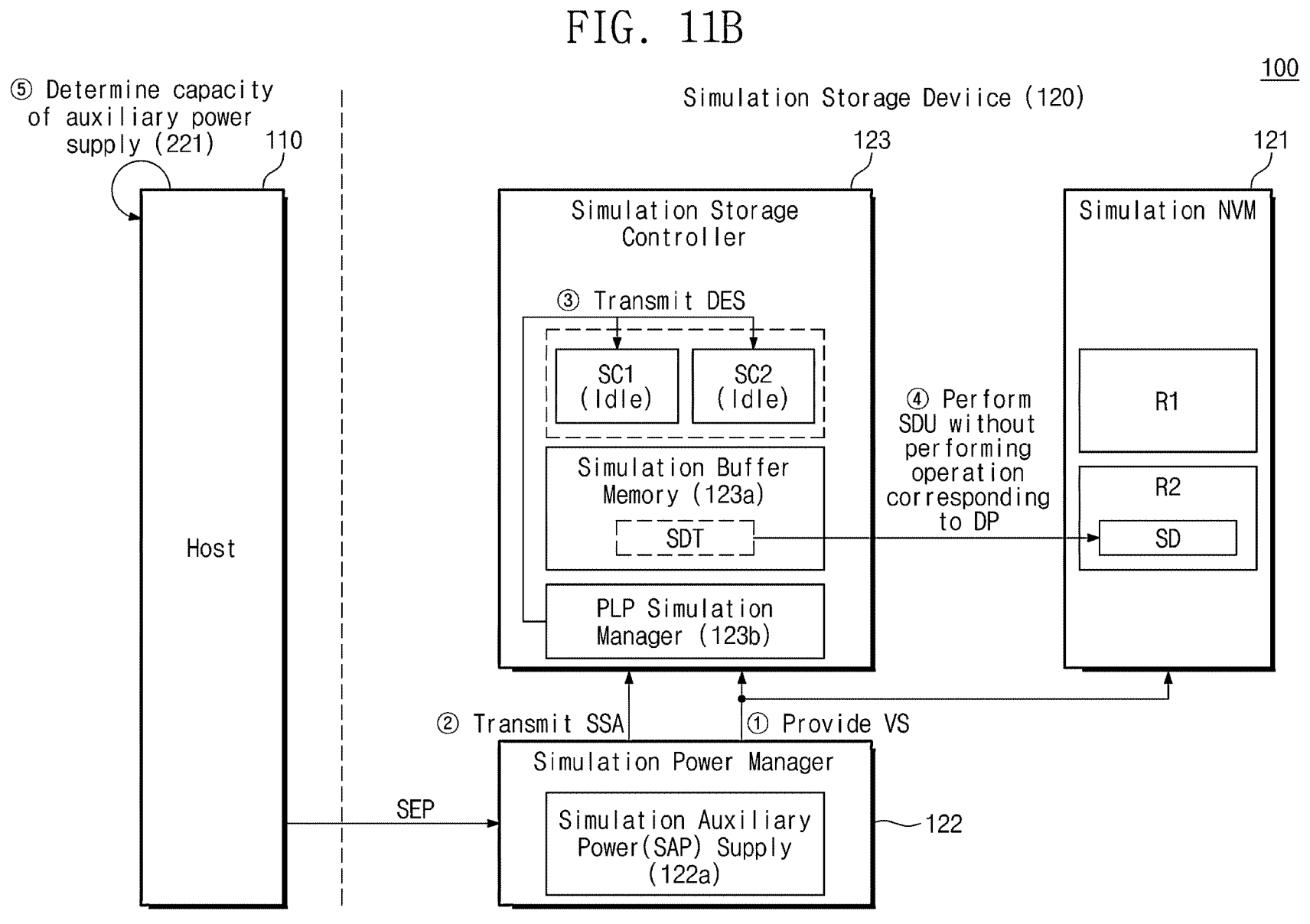

Simulation Storage Device (120)

Simulation NVM — 121

R1

R2

SD

⑤ Determine capacity of auxiliary power supply (221)

Host — 110

Simulation Storage Controller — 123

④ Perform SDU without performing operation corresponding to DP

③ Transmit DES

SC1 (Idle)

SC2 (Idle)

Simulation Buffer Memory (123a)

SDT

PLP Simulation Manager (123b)

① Provide VS

② Transmit SSA

Simulation Power Manager — 122

Simulation Auxiliary Power(SAP) Supply (122a)

SEP

FIG. 12B

SIMULATION SYSTEM FOR AUXILIARY POWER SUPPLY IN STORAGE DEVICES

CROSS-REFERENCE TO THE RELATED APPLICATION

This application claims priority under 35 U.S.C. § 119 to Korean Patent Application No. 10-2023-0154004 filed on Nov. 8, 2023, in the Korean Intellectual Property Office, the disclosures of which are incorporated by reference herein in their entireties.

BACKGROUND

One or more example embodiments of the present disclosure described herein relate to a simulation system, and more particularly, relate to a simulation system that determines a capacity of an auxiliary power supply in a storage device.

In general, a storage device including a nonvolatile memory device and a storage controller operates based on a power supplied from the outside. Meanwhile, a sudden power-off event in which an external power is suddenly turned off while the storage device operates may occur. In this case, because the storage controller stores data by using a volatile memory, the data stored in the volatile memory may be lost, or an operation performed by the storage controller may not be completed. To solve the above issue, a storage system uses an auxiliary power supply to complete the operation being performed and to back up the data.

SUMMARY

One or more example embodiments of the present disclosure provide a simulation system for an auxiliary power supply of a storage device with improved performance.

According to an embodiment, a simulation system includes a storage device including an auxiliary power supply configured to generate an auxiliary power, the storage device being configured to, based on detecting a sudden power-off (SPO) event, perform a power loss protection (PLP) procedure associated with backing up operation data based on the auxiliary power; and a storage simulator including a first simulation central processing unit (CPU) and a second simulation CPU, the storage simulator being configured to, based on detecting the SPO event, perform a PLP simulation corresponding to the PLP procedure, configured to generate a power consumption value by measuring an amount of power consumed while the PLP simulation is performed, and configured to determine a capacity of the auxiliary power supply based on the power consumption value. The PLP procedure includes a dump preparation operation performed before the operation data are backed up. The PLP simulation includes a simulation dump preparation operation associated with the dump preparation operation. The first simulation CPU and the second simulation CPU are configured to perform the simulation dump preparation operation and terminate performing the simulation dump preparation operation at different points in time.

According to an embodiment, a simulation system includes a storage device including an auxiliary power supply configured to generate an auxiliary power, the storage device being configured to, based on detecting a sudden power-off (SPO) event, perform a power loss protection (PLP) procedure associated with backing up operation data based on the auxiliary power, and configured to store PLP data associated with the PLP procedure; and a storage simulator configured to, based on detecting the SPO event, perform a PLP simulation corresponding to the PLP procedure by using the PLP data, configured to generate a power consumption value by measuring an amount of power consumed while the PLP simulation is performed, and configured to determine a capacity of the auxiliary power supply based on the power consumption value. The PLP procedure includes a dump preparation operation performed before the operation data are backed up. The PLP simulation includes a simulation dump preparation operation associated with the dump preparation operation that causes a maximum of power consumption in the auxiliary power supply.

According to an embodiment, a simulation system includes a storage simulator, and a storage device. The storage device includes an auxiliary power supply that generates an auxiliary power. The storage device is configured to, based on detecting a sudden power-off (SPO) event in the storage device, perform a power loss protection (PLP) procedure associated with backing up operation data based on the auxiliary power. The storage simulator includes a simulation auxiliary power supply configured to generate a simulation auxiliary power. The storage simulator is configured to: perform, based on detecting the SPO event in the storage simulator, a PLP simulation corresponding to the PLP procedure; generate a power consumption value by measuring an amount of power consumed in the simulation auxiliary power supply while the PLP simulation is performed; and determine a first capacity of the auxiliary power supply based on the power consumption value. The storage device is further configured to, after the PLP simulation, perform another PLP procedure and generate PLP data associated with the another PLP procedure. The storage simulator is further configured to determine whether the first capacity is sufficient to perform the another PLP procedure, based on the PLP data. The PLP procedure includes a dump preparation operation performed before the operation data are backed up, and the PLP simulation includes a simulation dump preparation operation associated with the dump preparation operation.

BRIEF DESCRIPTION OF THE FIGURES

The above and other objects and features of the present disclosure will become apparent by describing in detail example embodiments thereof with reference to the accompanying drawings.

FIG. 5 is a diagram for describing a storage controller of FIG. 3 and a simulation storage controller of FIG. 4.

FIGS. 11A and 11B are diagrams for describing an example of an operation of a storage simulator of FIG. 2.

FIGS. 12A and 12B are diagrams for describing an operation of a storage device according to one or more example embodiments of the present disclosure.

DETAILED DESCRIPTION

Below, example embodiments of the present disclosure will be described in detail and clearly to such an extent that an ordinary one in the art easily carries out the present disclosure.

Figure 1:
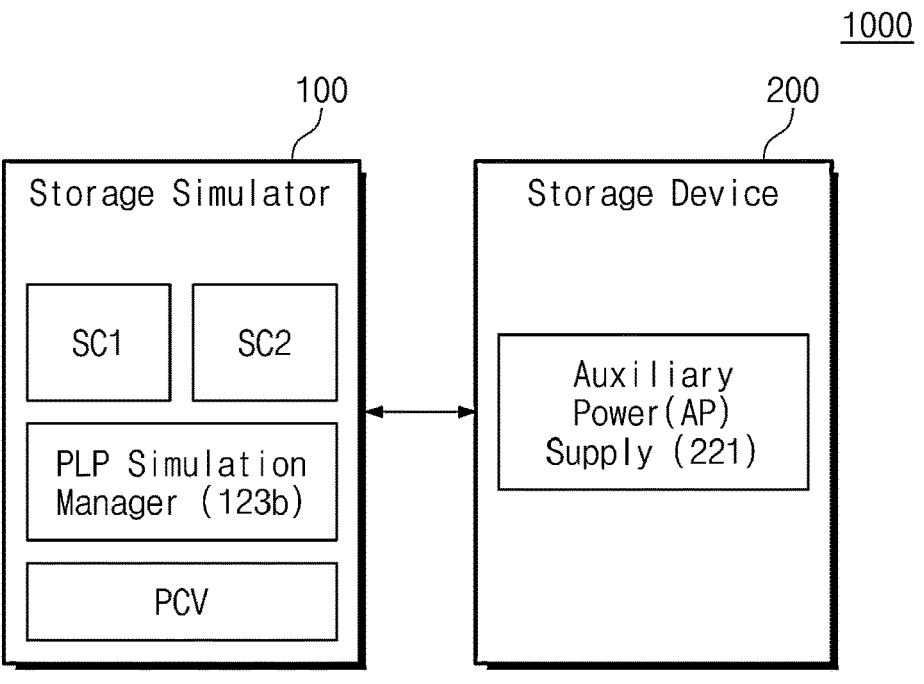
FIG. 1 is a block diagram illustrating a simulation system according to one or more example embodiments of the present disclosure.

FIG. 1 is a block diagram illustrating a simulation system according to one or more example embodiments of the present disclosure. Referring to FIG. 1, a simulation system 1000 may include a storage simulator 100 and a storage device 200.

The storage simulator 100 may perform a power loss protection (PLP) simulation for determining a capacity of an auxiliary power supply 221 included in the storage device 200. The storage simulator 100 may measure a power consumed while performing the PLP simulation and may generate a power consumption value PCV indicating an amount of power consumption thus measured. The storage simulator 100 may determine the capacity of the auxiliary power supply 221 based on the power consumption value PCV.

The storage device 200 may be a device which stores data input from an outside and transmits the stored data to the outside. The storage device 200 may include the auxiliary power supply 221. The auxiliary power supply 221 may generate an auxiliary power AP (refer to FIG. 3). The auxiliary power supply 221 may supply the auxiliary power AP to the storage device 200 in a specific situation. For example, the specific situation may mean a sudden power-off (SPO) situation where power is suddenly turned off while the storage device 200 operates.

In the SPO situation, to prevent operation data from being lost, the storage device 200 may perform a PLP procedure. The storage device 200 may perform the PLP procedure based on the auxiliary power AP. The PLP procedure may be a procedure associated with a backup of the operation data. The operation data may include data generated while the storage device 200 operates. The operation data may include pieces of data required for a system recovery after the SPO situation is resolved.

For example, the PLP procedure may include a dump preparation operation and a dump operation. The dump preparation operation may include an operation of completing an operation being performed in the storage device 200 when the SPO situation occurs. The dump operation may include an operation of backing up the operation data.

To prevent the operation data of the storage device 200 from being lost in the SPO situation, the auxiliary power supply 221 may supply the auxiliary power AP to the storage device 200. The amount of auxiliary power AP which the auxiliary power supply 221 is capable of supplying may be determined by the capacity of the auxiliary power supply 221. As the capacity of the auxiliary power supply 221 becomes larger, an area which is occupied by the auxiliary power supply 221 in the storage device 200 may increase.

For example, the capacity of the auxiliary power supply 221 may not be sufficient. In this case, in the SPO situation, the storage device 200 may fail to complete performing the PLP procedure based on the auxiliary power AP. This may mean that the data of the storage device 200 are lost. Meanwhile, when the capacity of the auxiliary power supply 221 is sufficient, the storage device 200 may complete performing the PLP procedure in the SPO situation. However, when the capacity of the auxiliary power supply 221 is excessively large, it may not be easy to implement the circuitry of the storage device 200 due to the area occupied by the auxiliary power supply 221. Also, costs for manufacturing the storage device 200 may increase.

Accordingly, it may be important to appropriately set the capacity of the auxiliary power supply 221. That is, the capacity of the auxiliary power supply 221 needs to be set to an appropriate capacity. The appropriate capacity may be determined based on a maximum amount of power consumption in the auxiliary power supply 221.

The appropriate capacity may mean a capacity which is sufficient for the storage device 200 to perform the PLP procedure that causes a maximum of power consumption in the auxiliary power supply 221 but is not large enough to affect implementation of the circuitry of the storage device 200. To set the capacity of the auxiliary power supply 221 to the appropriate capacity, it may be needed to accurately measure an amount of power consumed when the dump preparation operation is performed and an amount of power consumed when the dump operation is performed.

In an embodiment, as described above, the storage simulator 100 may determine the capacity of the auxiliary power supply 221 based on a result of the PLP simulation. The storage simulator 100 may be implemented by replicating the storage device 200. This may mean that the PLP simulation is capable of being performed in an environment identical (or substantially identical) to an actual operation environment. In this case, the PLP simulation may correspond to the PLP procedure. In an embodiment, the storage simulator 100 may perform the PLP simulation implementing the PLP procedure that causes a maximum of power consumption in the auxiliary power supply 221.

In an embodiment, the storage simulator 100 may measure a power which is internally consumed while the PLP simulation is performed and may generate the power consumption value PCV. The PLP simulation may include a simulation dump preparation operation corresponding to the dump preparation operation and a simulation dump operation corresponding to the dump operation. In this case, the power consumption value PCV may include a measurement value corresponding to power consumption of the storage device 200 caused while the simulation dump preparation operation is performed and a measurement value corresponding to power consumption of the storage device 200 caused while the simulation dump operation is performed. Because the simulation dump preparation operation and the simulation dump operation are performed in an environment identical actual operation environment, the above measurement values may correspond to power consumption caused while the dump preparation operation and the dump operation are performed, respectively.

Accordingly, the storage simulator 100 according to one or more example embodiments of the present disclosure may perform a PLP simulation operation corresponding to the PLP procedure in an environment identical to the operation environment of the storage device 200. Also, the storage simulator 100 may actually measure power consumption caused while the PLP simulation is performed and may determine the capacity of the auxiliary power supply 221 based on the power consumption value PCV.

According to an embodiment, the storage simulator 100 may perform the PLP simulation implementing the PLP procedure that causes a maximum of power consumption and based thereon may determine the capacity of the auxiliary power supply 221. In this case, the auxiliary power supply 221 whose capacity is determined by the storage simulator 100 may provide the storage device 200 with the auxiliary power AP sufficient to perform the PLP procedure even in any situation.

Meanwhile, the storage simulator 100 may include a first simulation central processing unit (CPU) SC1 and a second simulation CPU SC2. The first simulation CPU SC1 and the second simulation CPU SC2 may perform the simulation dump preparation operation and the simulation dump operation in parallel. The first simulation CPU SC1 and the second simulation CPU SC2 may terminate the execution of the simulation dump preparation operation at different points in time.

Also, the storage simulator 100 may include a PLP simulation manager 123b. The PLP simulation manager 123b may control the timing when each of the simulation CPUs SC1 and C2 terminates the execution of the simulation dump preparation operation. Accordingly, the PLP simulation manager 123b may implement the simulation dump preparation operation similar to the dump preparation operation which is actually performed in the storage device 200.

That is, the storage simulator 100 may determine the capacity of the auxiliary power supply 221 based on the power consumption value PCV measured in an environment substantially identical to the operation environment in which the storage device 200 performs the PLP procedure. Accordingly, the storage simulator 100 may accurately estimate the capacity of the auxiliary power supply 221.

The storage simulator 100 and the storage device 200 will be described in detail with reference to the following drawings.

Figure 2:
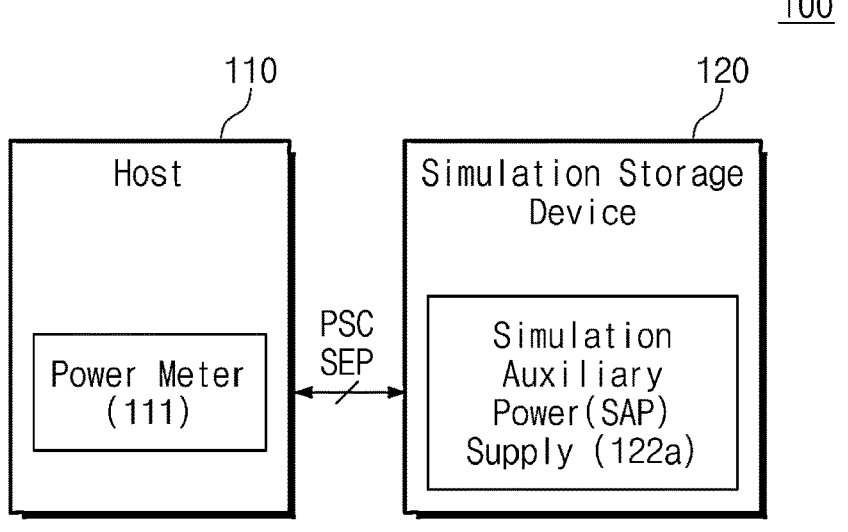
FIG. 2 is a diagram illustrating a storage simulator of FIG. 1.

FIG. 2 is a diagram illustrating a storage simulator of FIG. 1. Referring to FIG. 2, the storage simulator 100 may include a host 110 and a simulation storage device 120.

The host 110 may control an overall operation of the simulation storage device 120. For example, the host 110 may transmit, to the simulation storage device 120, a command for storing data in the simulation storage device 120 or reading data stored in the simulation storage device 120. The host 110 may supply a simulation external power SEP to the simulation storage device 120. In an embodiment, the host 110 may include an external power device (not shown) for generating the simulation external power SEP The host 110 may transmit a PLP simulation command PSC to the simulation storage device 120. For example, the PLP simulation command PSC may be a command which allows the simulation storage device 120 to perform the simulation dump preparation operation corresponding to the dump preparation operation in the SPO situation. The host 110 may transmit the PLP simulation command PSC to the simulation storage device 120 based on detection of the SPO event. For example, the host 110 may monitor the simulation external power SEP and detect the SPO event based on a voltage level of the simulation external power SEP (e.g., based on the voltage level of the simulation external power SEP being lower than an allowable voltage level).

In an embodiment, the host 110 may include a power meter 111. The power meter 111 may measure power consumption caused while the PLP simulation is performed and may generate the power consumption value PCV. In detail, the power meter 111 may measure power consumption caused in a simulation auxiliary power supply 122a while the PLP simulation is performed and may generate the power consumption value PCV.

In an embodiment, the power meter 111 may be a power analyzer.

The host 110 may determine the capacity of the auxiliary power supply 221 (refer to FIG. 1) based on the power consumption value PCV.

The simulation storage device 120 may operate under control of the host 110. The simulation storage device 120 may include the simulation auxiliary power supply 122a. The simulation auxiliary power supply 122a may generate a simulation auxiliary power SAP. The simulation storage device 120 may detect whether the SPO situation occurs in the simulation storage device 120, based on a change in the voltage level of the simulation external power SEP. When the occurrence of the SPO situation is detected, the simulation storage device 120 may perform the PLP simulation based on the simulation auxiliary power SAP and the PLP simulation command PSC.

In an embodiment, the simulation storage device 120 may be implemented by replicating the storage device 200 (refer to FIG. 1).

Figure 3:
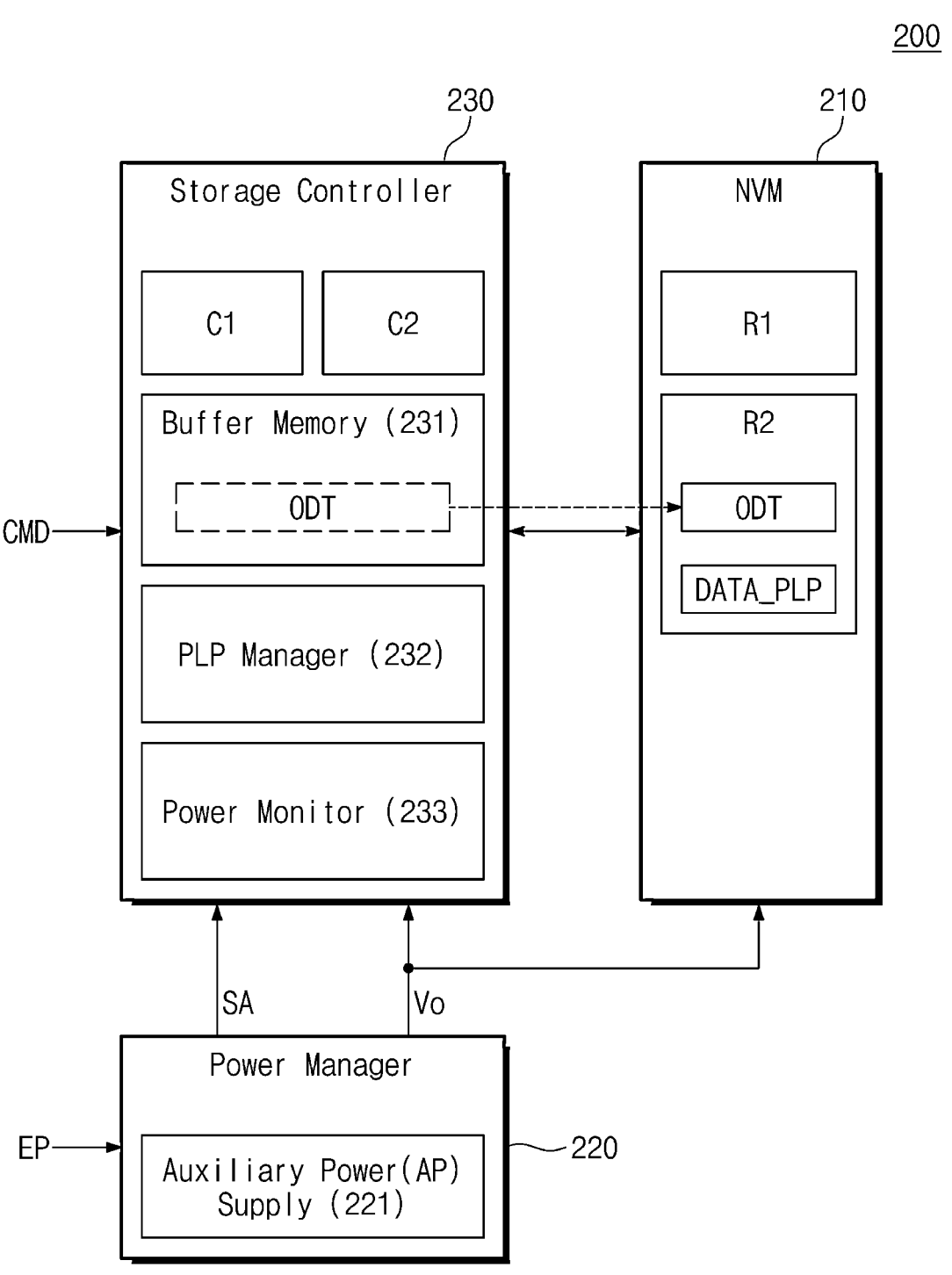
FIG. 3 is a diagram illustrating a storage device of FIG. 1.

FIG. 3 is a diagram illustrating a storage device of FIG. 1. Referring to FIG. 3, the storage device 200 may include a nonvolatile memory device 210, a power manager 220, and a storage controller 230.

Under control of the storage controller 230, the nonvolatile memory device 210 may be configured to store data, to output the stored data, or to erase the stored data. In an embodiment, the nonvolatile memory device 210 may be a two-dimensional or three-dimensional flash memory device, but the present disclosure is not limited thereto. For example, the nonvolatile memory device 210 may be a magnetic RAM (MRAM), a spin-transfer torque MRAM, a conductive bridging RAM (CBRAM), a ferroelectric RAM (FRAM), a phase change RAM (PRAM), a resistive RAM (RRAM), or a memory device which is based on various kinds of memories. In an embodiment, the nonvolatile memory device 210 may include a plurality of nonvolatile memories, and each of the plurality of nonvolatile memories may be implemented with a separate chip or a separate package. The storage controller 230 may communicate with the plurality of nonvolatile memories of the nonvolatile memory device 210 through a plurality of channels.

In an embodiment, the nonvolatile memory device 210 may include a first region R1 and a second region R2. For example, each of the first region R1 and the second region R2 may include a plurality of memory cells. In an embodiment, the first region R1 may be implemented with a triple level cell which stores three bits, and the second region R2 may be implemented with a single level cell which stores one bit.

The power manager 220 may include the auxiliary power supply 221, which generates the auxiliary power AP. The auxiliary power supply 221 may generate the auxiliary power AP. The power manager 220 may be supplied with an external power EP from an external host (e.g., the host 110 of FIG. 2 or any other host). The power manager 220 may supply an operating voltage Vo to the nonvolatile memory device 210 and the storage controller 230. The operating voltage Vo may be a voltage which is based on the external power EP or the auxiliary power AP. In a normal situation (e.g., a situation being not the SPO situation), the operating voltage Vo may be based on the external power EP. In the SPO situation, the operating voltage Vo may be based on the auxiliary power AP.

The power manager 220 may detect a change in the voltage level of the external power EP. For example, when the voltage level of the external power EP is higher than or equal to an allowable voltage level, the power manager 220 may supply the operating voltage Vo based on the external power EP.

For example, when the voltage level of the external power EP is lower than the allowable voltage level, the power manager 220 may detect the occurrence of the SPO situation in the storage device 200. In this case, the power manager 220 may supply the operating voltage Vo based on the auxiliary power AP. Also, the power manager 220 may transmit an SPO alert signal SA notifying the occurrence of the SPO situation to the storage controller 230.

The storage controller 230 may perform the write operation, the read operation, or the erase operation in response to a command CMD from the external host.

The storage controller 230 may receive the SPO alert signal SA from the power manager 220. The storage controller 230 may perform the PLP procedure in response to the SPO alert signal SA. The storage controller 230 may perform the PLP procedure based on the auxiliary power AP.

The storage controller 230 may control the nonvolatile memory device 210 and the power manager 220. The storage controller 230 may include CPUs C1 and C2, a buffer memory 231, a PLP manager 232, and a power monitor 233. An example in which the storage controller 230 includes two CPUs C1 and C2 is illustrated in FIG. 3, but the present disclosure is not limited thereto and the storage controller 230 may include a various number of a CPU.

The CPUs C1 and C2 may perform the PLP procedure. For example, the CPUs C1 and C2 may perform the PLP procedure in parallel. In an embodiment, the PLP procedure may include the dump preparation operation and the dump operation. For example, the dump preparation operation may include an operation of completing an operation performed by each of the CPUs C1 and C2 at the occurrence of the SPO event. The dump operation may indicate an operation of backing up operation data ODT present in the buffer memory 231. For example, the dump operation may include an operation of moving the operation data ODT present in the buffer memory 231 to the nonvolatile memory device 210. In an embodiment, the dump operation may include an operation of storing the operation data ODT in the second region R2 of the nonvolatile memory device 210.

The buffer memory 231 may store the operation data ODT. For example, the operation data ODT may include pieces of data generated while the storage controller 230 operates and pieces of data required for a system recovery after the SPO situation is resolved. The buffer memory 231 may be a volatile memory device. For example, the buffer memory 231 may be implemented with a static random access memory (SRAM), a dynamic random access memory (DRAM), etc.

The PLP manager 232 may generate PLP data DATA_PLP associated with the PLP procedure while the PLP procedure is performed. The PLP manager 232 may store the PLP data DATA_PLP in the nonvolatile memory device 210. For example, when the PLP procedure ends, the PLP manager 232 may store the PLP data DATA_PLP in the nonvolatile memory device 210.

In an embodiment, the PLP manager 232 may store the PLP data DATA_PLP in the second region R2 of the nonvolatile memory device 210.

In an embodiment, the PLP data DATA_PLP may include information about a time during which each of the CPUs C1 and C2 performs the dump preparation operation. For example, the PLP data DATA_PLP may include information about a point in time when the SPO event occurs in the storage device 200 and a point in time when each of the CPUs C1 and C2 terminates the execution of the dump preparation operation.

The power monitor 233 may generate power consumption information. The power monitor 233 may include at least one analog-digital converter (ADC). The power monitor 233 may generate the power consumption information based on an operation of the at least one ADC. For example, the power consumption information may include information about the amount of power consumption of the auxiliary power supply 221 caused while the dump preparation operation is performed and the amount of power consumption of the auxiliary power supply 221 caused while the dump operation is performed. The power consumption information will be described in detail with reference to FIG. 9.

In an embodiment, the PLP data DATA_PLP may include the power consumption information.

In an embodiment, the storage simulator 100 may check the PLP data DATA_PLP. In an embodiment, the storage simulator 100 may control the PLP simulation based on the PLP data DATA_PLP.

In an embodiment, the storage simulator 100 may check the PLP data DATA_PLP. For example, the PLP data DATA_PLP may be generated after the PLP simulation is performed. In this case, the storage simulator 100 may determine whether the capacity of the auxiliary power supply 221 determined based on the power consumption value PCV (refer to FIG. 1) is sufficient to perform the PLP procedure, based on the PLP data DATA_PLP.

In an embodiment, the storage simulator 100 may check the PLP data DATA_PLP. For example, the PLP data DATA_PLP may be generated after the PLP simulation is performed. In this case, the storage simulator 100 may adjust the PLP simulation based on the PLP data DATA_PLP.

In an embodiment, the storage simulator 100 may determine operation times and operation kinds associated with the PLP simulation, based on the PLP data DATA_PLP generated after the PLP simulation is performed.

Figure 4:
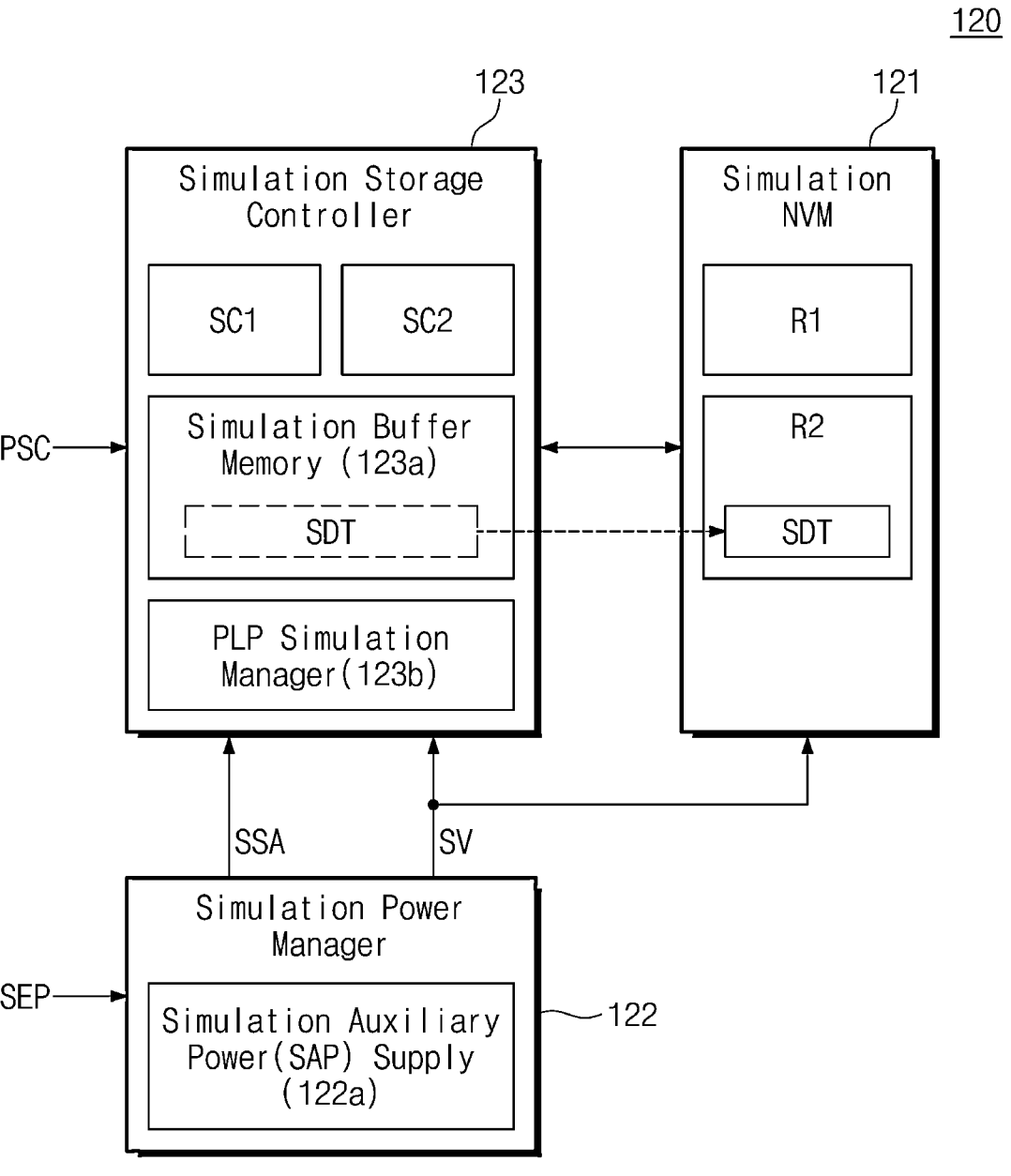
FIG. 4 is a diagram illustrating a simulation storage device of FIG. 2.

FIG. 4 is a diagram illustrating a simulation storage device of FIG. 2. Referring to FIG. 4, the simulation storage device 120 may include a simulation nonvolatile memory device 121, a simulation power manager 122, and a simulation storage controller 123.

In an embodiment, the simulation nonvolatile memory device 121 may correspond to the nonvolatile memory device 210 of the storage device 200, the simulation power manager 122 may correspond to the power manager 220 of the storage device 200, and the simulation storage controller 123 may correspond to the storage controller 230 of the storage device 200.

For example, the simulation nonvolatile memory device 121 may be implemented to have the same or similar structure as the nonvolatile memory device 210, and the simulation storage controller 123 may be implemented to have the same or similar structure of the storage controller 230. For example, except for the capacity of the simulation auxiliary power supply 122a, the simulation power manager 122 may be implemented to have the same or similar structure as the power manager 220.

Accordingly, the PLP simulation may be performed in an environment identical (or substantially identical) to an environment in which the PLP procedure is performed. That is, the simulation storage device 120 may be implemented by replicating the storage device 200.

Under control of the simulation storage controller 123, the simulation nonvolatile memory device 121 may be configured to store data, to output the stored data, or to erase the stored data. In an embodiment, like the nonvolatile memory device 210, the simulation nonvolatile memory device 121 may include a first region R1 and a second region R2. In an embodiment, the first region R1 may be implemented with a triple level cell, and the second region R2 may be implemented with a single level cell.

The simulation power manager 122 may include the simulation auxiliary power supply 122a which generates the simulation auxiliary power SAP. The simulation power manager 122 may be supplied with the simulation external power SEP from the host 110. The simulation power manager 122 may supply a simulation voltage SV to the simulation nonvolatile memory device 121 and the simulation storage controller 123.

The simulation voltage SV may be a voltage which is based on the simulation external power SEP or the simulation auxiliary power SAP. In a normal situation (e.g., a situation being not the SPO situation), the simulation voltage SV may be based on the simulation external power SEP. In the SPO situation, the simulation voltage SV may be based on the simulation auxiliary power SAP.

The simulation power manager 122 may detect a change in the voltage level of the simulation external power SEP. When the voltage level of the simulation external power SEP is higher than or equal to the allowable voltage level, the simulation power manager 122 may supply the simulation voltage SV based on the simulation external power SEP.

When the voltage level of the simulation external power SEP is lower than the allowable voltage level, the simulation power manager 122 may detect the occurrence of the SPO situation in the simulation storage device 120. In this case, the simulation power manager 122 may supply the simulation voltage SV based on the simulation auxiliary power SAP. Also, the simulation power manager 122 may transmit a simulation SPO alert signal SSA notifying the occurrence of the SPO situation to the simulation storage controller 123.

In an embodiment, the capacity of the simulation auxiliary power supply 122a may be larger than the capacity of the auxiliary power supply 221 (refer to FIG. 3). In an embodiment, the voltage level of the simulation external power SEP may be identical (or substantially identical) to the voltage level of the external power EP (refer to FIG. 3). Also, the voltage level of the simulation SPO alert signal SSA may be identical (or substantially identical) to the voltage level of the SPO alert signal SA (refer to FIG. 3). Also, the voltage level of the simulation voltage SV may be identical (or substantially identical) to the voltage level of the operating voltage Vo.

The simulation storage controller 123 may receive the simulation SPO alert signal SSA from the simulation power manager 122. The simulation storage controller 123 may perform the PLP simulation in response to the simulation SPO alert signal SSA. The simulation storage controller 123 may perform the PLP simulation based on the simulation auxiliary power SAP.

In an embodiment, the simulation storage controller 123 may perform the write operation, the read operation, or the erase operation on the simulation nonvolatile memory device 121 in response to the PLP simulation command PSC from the host 110.

The simulation storage controller 123 may control the simulation nonvolatile memory device 121 and the simulation power manager 122. The simulation storage controller 123 may include simulation CPUs SC1 and SC2, a simulation buffer memory 123a, and the PLP simulation manager 123b.

The simulation CPUs SC1 and SC2 may perform the PLP simulation. The PLP simulation may include the simulation dump preparation operation and the simulation dump operation. For example, the simulation dump preparation operation may indicate that the simulation CPUs SC1 and SC2 perform an operation corresponding to the PLP simulation command PSC. For example, the simulation dump operation may indicate an operation of backing up simulation data SDT present in the simulation buffer memory 123a.

Under control of the PLP simulation manager 123b, the simulation CPUs SC1 and SC2 may perform the simulation dump preparation operation in parallel. Also, under control of the PLP simulation manager 123b, the simulation CPUs SC1 and SC2 may perform the simulation dump operation in parallel.

In an embodiment, the PLP simulation may only include the simulation dump operation. In this case, the simulation CPUs SC1 and SC2 may only perform the simulation dump operation in parallel without performing the simulation dump preparation operation.

In an embodiment, the simulation dump preparation operation may include at least one of a sequential write operation on the simulation nonvolatile memory device 121 and an erase operation on the simulation nonvolatile memory device 121.

In an embodiment, the simulation dump operation may include an operation of moving the simulation data SDT from the simulation buffer memory 123a to the simulation nonvolatile memory device 121. In an embodiment, the simulation CPUs SC1 and SC2 may store the simulation data SDT in the second region R2 of the simulation nonvolatile memory device 121 through the simulation dump operation.

The simulation buffer memory 123a may store the simulation data SDT. The simulation buffer memory 123a may be a volatile memory device. In an embodiment, before the simulation dump operation is initiated, the simulation buffer memory 123a may be in a state in which no free storage space exists. That is, the size of the simulation data SDT may be identical to the size of the storage space of the simulation buffer memory 123a. However, this is only an example and the disclosure is not limited thereto.

The PLP simulation manager 123b may manage the PLP simulation.

In an embodiment, the PLP simulation manager 123b may control the simulation CPUs SC1 and SC2 such that the simulation dump preparation operation is performed during a given time from a point in time when the SPO situation occurs.

For example, the PLP simulation manager 123b may control the timing when each of the simulation CPUs SC1 and SC2 terminates the execution of the simulation dump preparation operation. Accordingly, before the simulation dump operation, each of the simulation CPUs SC1 and SC2 may perform the simulation dump preparation operation based on the PLP simulation command PSC.

In this case, the power consumption value PCV (refer to FIG. 1) may include a first measurement value and a second measurement value. The first measurement value may indicate the amount of power consumption caused in the simulation auxiliary power supply 122a while the simulation dump preparation operation is performed. The second measurement value may indicate the amount of power consumption caused in the simulation auxiliary power supply 122a while the simulation dump operation is performed.

For example, the PLP simulation manager 123b may control the simulation CPUs SC1 and SC2 such that the simulation dump operation is performed immediately upon or after detection that the SPO situation occurs. In this case, the simulation CPUs SC1 and SC2 may not perform the simulation dump preparation operation. In this case, the power consumption value PCV (refer to FIG. 1) may not include the first measurement value and may only include the second measurement value.

For example, when the power consumption value PCV (refer to FIG. 1) includes only the second measurement value, the storage simulator 100 may determine the capacity of the auxiliary power supply 221 without considering the amount of power consumption caused while the dump preparation operation is performed. In this case, the determined capacity may not be sufficient to perform the PLP procedure.

For example, when the power consumption value PCV (refer to FIG. 1) includes only the second measurement value, the storage simulator 100 may calculate an estimation value for the amount of power consumption caused while a dump preparation operation is performed, based on the second measurement value. The storage simulator 100 may determine the capacity of the auxiliary power supply 221 based on the calculated estimation value and the power consumption value PCV. In this case, the determined capacity may be larger than an actual capacity required to perform the PLP procedure.

According to an embodiment of the present disclosure, the power consumption value PCV (refer to FIG. 1) may include the first measurement value as well as the second measurement value. The simulation system 1000 may determine the capacity of the auxiliary power supply 221 (refer to FIG. 1) in consideration of the amount of power consumption caused while the dump preparation operation is performed as well as the amount of power consumption caused while the dump operation is performed. Accordingly, the simulation system with improved performance may be provided.

FIG. 5 is a diagram for describing a storage controller of FIG. 3 and a simulation storage controller of FIG. 4. FIG. 5 will be described with reference to the storage controller 230, but the simulation storage controller 123 of FIG. 4 may be implemented to be similar in structure to the storage controller 230 of FIG. 5.

The storage controller 230 may include the buffer memory 231, the PLP manager 232, power monitor 233, a flash translation layer (FTL) 234, an error correction code (ECC) engine 235, a nonvolatile memory device interface 236, a host interface 237, a side-band interface 238, and CPUs 239.

The buffer memory 231, the PLP manager 232, the power monitor 233, the flash translation layer 234, the ECC engine 235, the nonvolatile memory device interface 236, the host interface 237, the side-band interface 238 and the CPUs 239 may be connected to each other through a bus.

The CPUs 239 may control an overall operation of the storage controller 230. The CPUs 239 may correspond to the CPUs C1 and C2 of FIG. 3. For example, the PLP manager 232 and the FTL 234 may be provided in the form of software and may be driven by the CPUs 239. For example, the simulation buffer memory 123a (refer to FIG. 4) may be provided in the form of software and may be driven by the simulation CPUs SC1 and SC2 (refer to FIG. 4) corresponding to the CPUs 233.

The buffer memory 231 may be used as a main memory, a buffer memory, and/or a cache memory of the storage controller 230.

The ECC engine 235 may detect and correct an error of data obtained from the nonvolatile memory device 210. For example, the ECC engine 235 may have an error correction capability of a given level. The ECC engine 235 may process data whose error level (e.g., the number of flipped bits) exceeds the error correction capability, as an uncorrectable error.

The FTL 234 may translate a logical address received from an external device, for example, an external host into a physical address used in the nonvolatile memory device 210.

In an embodiment, the PLP manager 232 and the PLP simulation manager 123b (refer to FIG. 4) may be implemented in the form of firmware. For example, the CPUs 239 may implement the PLP manager 232 by loading instructions stored in the nonvolatile memory device 210 to the buffer memory 231 and executing the loaded instructions. However, the present disclosure is not limited thereto. For example, the PLP manager 232 and the PLP simulation manager 123b (refer to FIG. 4) may be implemented with separate hardware or may be implemented with a combination of hardware and software.

The storage controller 230 may communicate with the nonvolatile memory device 210 (refer to FIG. 3) through the nonvolatile memory interface 236. For example, the nonvolatile memory interface 236 may be implemented based on a NAND interface.

The storage controller 230 may communicate with the host through the host interface 237. For example, the host may mean the host 110 of FIG. 2 or any other external host. In some embodiments, the host interface 237 may be implemented based on at least one of various interfaces such as a serial ATA (SATA) interface, a peripheral component interconnect express (PCIe) interface, a serial attached SCSI (SAS), a nonvolatile memory express (NVMe) interface, a universal flash storage (UFS) interface, and a compute express link (CXL) interface.

The storage controller 230 may communicate with the power manager 220 through the side-band interface 238. For example, the side-band interface 238 may be an I2C interface which includes a single serial data line (SDA) and a single serial clock line (SCL) and is capable of supporting a bidirectional communication. The side-band interface 238 may be a general-purpose input/output (GPIO) interface. The side-band interface 238 may be replaced with various protocols such as a system management bus (SMBus), a universal asynchronous receiver transmitter (UART), a serial peripheral interface (SPI), and a high-speed inter-chip (HSIC).

Figure 6:
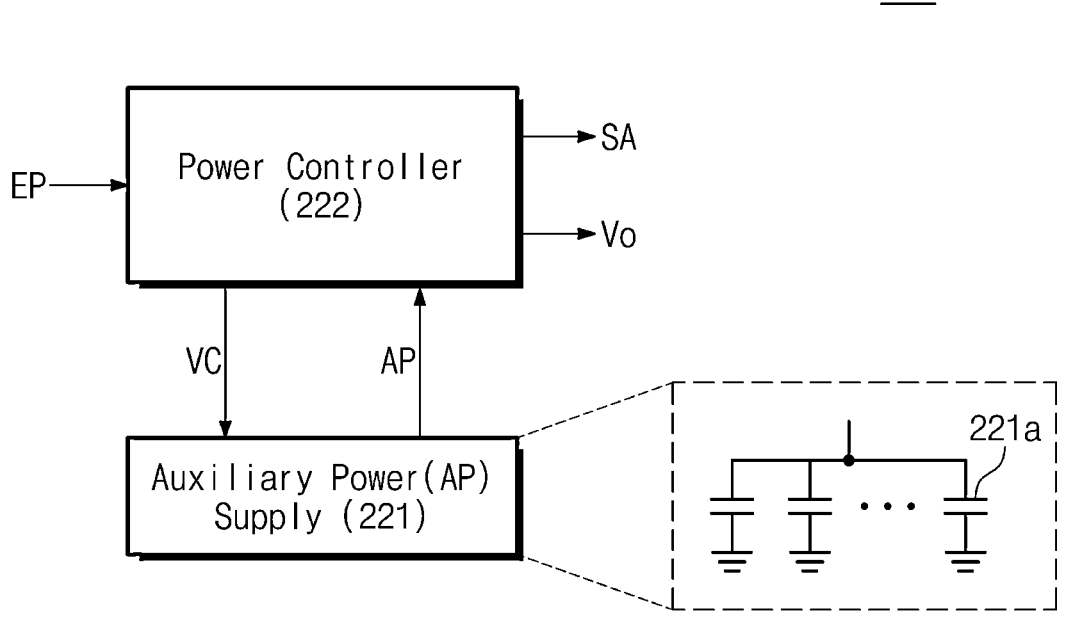
FIG. 6 is a diagram for describing a power manager of FIG. 3 and a simulation power manager of FIG. 4.

FIG. 6 is a diagram for describing a power manager of FIG. 3 and a simulation power manager of FIG. 4. The power manager 220 of FIG. 3 is illustrated in FIG. 6, but the simulation auxiliary power supply 122a of FIG. 4 may be similar in structure to the power manager 220.

Referring to FIG. 6, the power manager 220 may include the auxiliary power supply 221 and a power controller 222.

The auxiliary power supply 221 may generate the auxiliary power AP and may provide the auxiliary power AP to the power controller 222. The auxiliary power supply 221 may include one or more capacitors 221a. For example, the auxiliary power supply 221 may have a structure in which at least two capacitors 221a are connected in parallel.

For example, the capacitors 221a may be classified as an electrolytic capacitor, a tantalum capacitor, a film capacitor, or a ceramic capacitor depending on a dielectric material. However, the present disclosure is not limited thereto.

The auxiliary power supply 221 may be charged by a charging voltage VC from the power controller 222. For example, the capacity of the auxiliary power supply 221 may be determined based on a capacity of each of the capacitors 221a and a number of capacitors 221a.

The power controller 222 may be supplied with the external power EP from the outside (e.g., the host 110 of FIG. 2 or any other host). The power controller 222 may be supplied with the auxiliary power AP from the auxiliary power supply 221. The power controller 222 may output the operating voltage Vo based on the external power EP and the auxiliary power AP. For example, the power controller 222 may supply the operating voltage Vo to the nonvolatile memory device 210 (refer to FIG. 3) and the storage controller 230 (refer to FIG. 3). Also, the power controller 222 may provide the auxiliary power supply 221 with the charging voltage VC for charging the auxiliary power supply 221. The charging voltage VC may be based on the external power EP.

Meanwhile, the power controller 222 may monitor the voltage level of the external power EP. The power controller 222 may determine whether the SPO situation occurs in the storage device 200, based on the voltage level of the external power EP. When the occurrence of the SPO situation is detected, the power controller 222 may transmit the SPO alert signal SA to the storage controller 230 (refer to FIG. 3).

When the external power EP is normally supplied to the power controller 222, the power controller 222 may output the operating voltage Vo based on the external power EP. In this case, the storage device 200 may operate based on the external power EP. For example, the case where the external power EP is normally supplied to the power controller 222 may mean the case where the voltage level of the external power EP is higher than or equal to the allowable voltage level. Also, the case where the external power EP is not normally supplied to the power controller 222 may mean the case where the voltage level of the external power EP is lower than the allowable voltage level.

For example, the external power EP may not be normally supplied to the power controller 222 in the SPO situation that the power is suddenly turned off while the storage device 200 operates.

Meanwhile, when the external power EP is not normally supplied to the power controller 222, the power controller 222 may not output the operating voltage Vo based on the external power EP, but the power controller 222 may output the operating voltage Vo based on the auxiliary power AP generated by the auxiliary power supply 221. Accordingly, in the SPO situation, the storage device 200 may operate based on the auxiliary power AP.

As described above, the simulation power manager 122 of FIG. 4 may be identical in structure to the power manager 220 of FIG. 6. That is, the simulation power manager 122 of FIG. 4 may include a simulation power controller corresponding to the power controller 222 and the simulation auxiliary power supply 122a corresponding to the auxiliary power supply 221.

The simulation auxiliary power supply 122a may include at least one capacitors (corresponding to 221a) and may supply the simulation auxiliary power SAP to the simulation power controller.

The simulation power controller may be supplied with the simulation external power SEP from the host 110 (refer to FIG. 2). The simulation power controller may monitor the voltage level of the simulation external power SEP and may determine whether the SPO situation occurs in the simulation storage device 120 (refer to FIG. 2). The simulation power controller may provide the simulation nonvolatile memory device 121 and the simulation storage controller 123 with the simulation external power SEP or the simulation voltage SV which is based on the simulation auxiliary power SAP and may transmit the simulation SPO alert signal SSA to the simulation storage controller 123 when the SPO situation occurs. Also, the simulation power controller may provide the simulation auxiliary power supply 122a with a simulation charging voltage (corresponding to VC) for charging the simulation auxiliary power supply 122a, based on the simulation external power.

In an embodiment, the capacity of the simulation auxiliary power supply 122a may be larger than the capacity of the auxiliary power supply 221. That is, the equivalent capacitance of the capacitors of the simulation auxiliary power supply 122a may be larger than the equivalent capacitance of the capacitors 221a of the auxiliary power supply 221.

Figure 7:
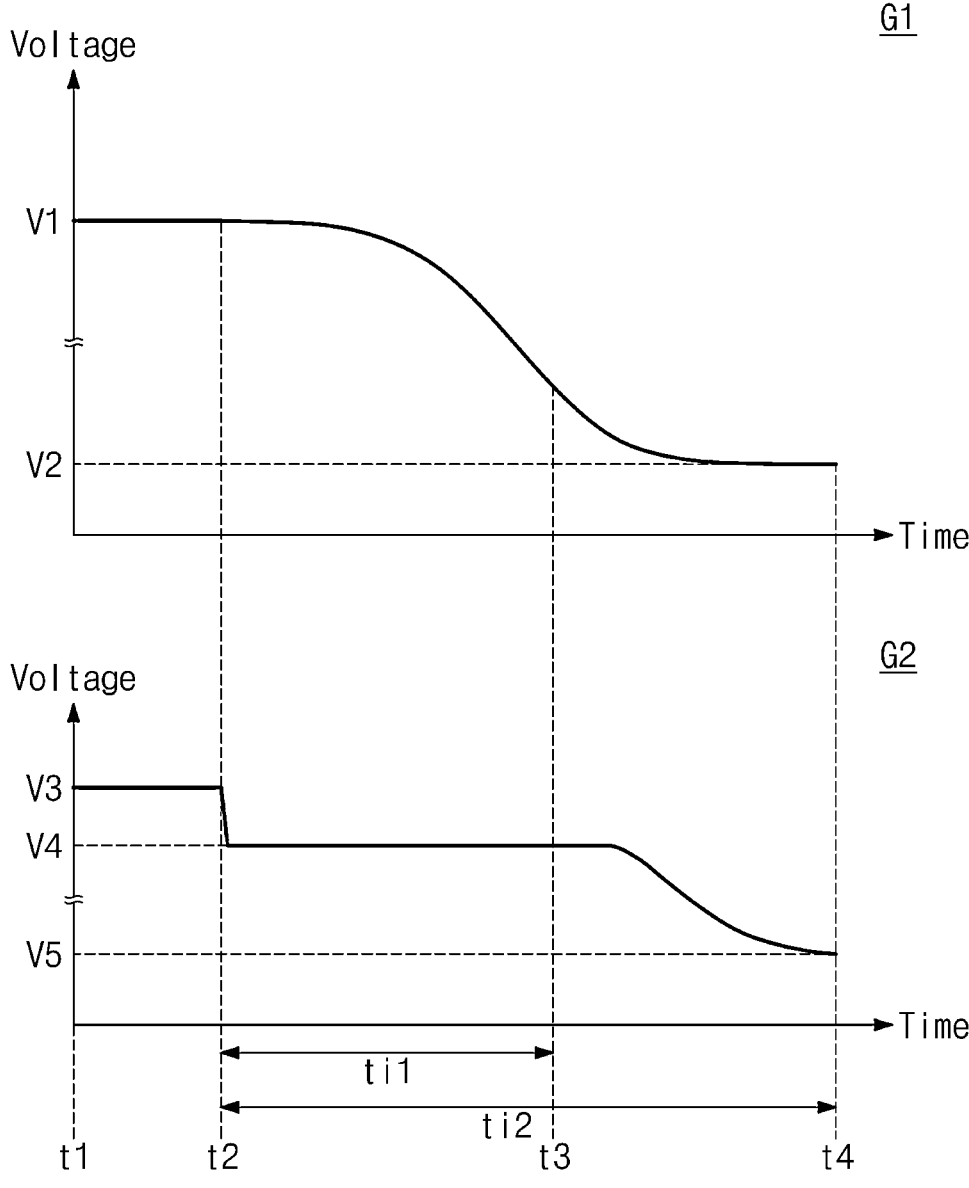
FIG. 7 is a diagram for describing an operation of a power manager of FIG. 6.

FIG. 7 is a diagram for describing an operation of a power manager of FIG. 6. In graphs G1, G2 of FIG. 7, a horizontal axis represents a time. In a first graph G1 of FIG. 7, a vertical axis represents a charging voltage of the auxiliary power supply 221; in a second graph G2 of FIG. 7, a vertical axis represents the operating voltage Vo. Referring to FIG. 7, before a first point in time t1, because the external power EP is normally supplied to the power manager 220, the power manager 220 may output the operating voltage Vo based on the external power EP. Also, the auxiliary power supply 221 may be charged based on the external power EP. Accordingly, at the first point in time t1, the charging voltage of the auxiliary power supply 221 may be a first voltage V1. Also, the operating voltage Vo which the power manager 220 outputs may be a third voltage V3.

Afterwards, at a second point in time t2, the SPO situation may occur, and the power manager 220 may operate based on the auxiliary power AP. Accordingly, the voltage level of the operating voltage Vo may not excessively decrease. In this case, the operating voltage Vo which the power manager 220 outputs may be a fourth voltage V4. The storage device 200 may not be turned off due to the operating voltage Vo which is based on the auxiliary power AP. At a second point in time t2, the storage device 200 may start to perform the PLP procedure based on the auxiliary power AP. For example, the PLP procedure may include the dump preparation operation and the dump operation described above.

Afterwards, at a third point in time t3, the storage device 200 may stop performing the PLP procedure.

At a fourth point in time t4, the charging voltage of the auxiliary power supply 221 may be a second voltage V2. Accordingly, at the fourth point in time t4, the auxiliary power supply 221 may be discharged, and the operating voltage Vo which the power manager 220 outputs may be a fifth voltage V5. For example, the fifth voltage V5 may be 0 V.

For example, when the SPO situation occurs, the storage device 200 may perform the PLP procedure during a first time interval ti1, which is from t2 to t3. Meanwhile, the auxiliary power supply 221 may supply the auxiliary power AP during a second time interval ti2, which is from t2 to t4. As described above, the SPO situation may occur at the second point in time t2.

For example, when the length of the second time interval ti2 is shorter than the length of the first time interval ti1, the storage device 200 may fail to complete the PLP procedure based on the auxiliary power AP.

Also, for example, the case where the length of the second time interval ti2 is excessively longer than the length of the first time interval ti1 may mean that the capacity of the auxiliary power supply 221 is too large. When the capacity of the auxiliary power supply 221 is excessively large, it may not be easy to implement the circuitry of the storage device 200 due to the area occupied by the auxiliary power supply 221 in the storage device 200. Also, costs for manufacturing the storage device 200 may increase.

As described above, the operation of the simulation power manager 122 of FIG. 4 may be similar to the operation of the power manager 220 described with reference to FIG. 7.

Figure 8:
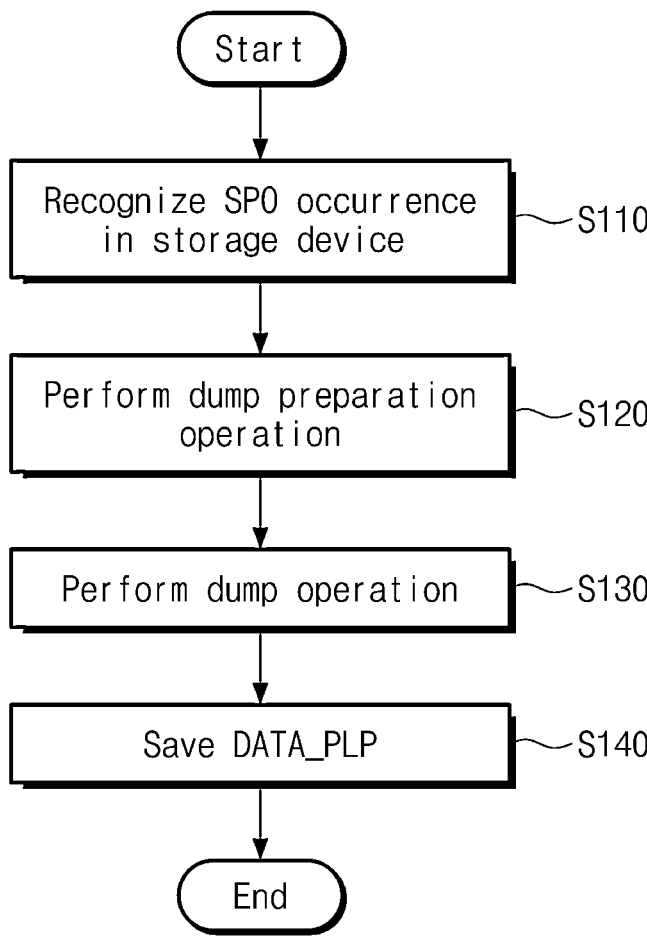
FIG. 8 is a flowchart for describing an operating method of a storage device of FIG. 1 when an SPO situation occurs.

FIG. 8 is a flowchart for describing an operating method of a storage device of FIG. 1 when an SPO situation occurs. FIG. 8 will be described with reference to FIGS. 1 to 7. Referring to FIG. 8, in operation S110, the storage device 200 may detect the occurrence of the SPO situation in the storage device 200. In detail, the storage device 200 may detect the occurrence of the SPO situation based on the voltage level of the external power EP being lower than the allowable voltage level.

In operation S120, the storage device 200 may perform the dump preparation operation. The storage device 200 may perform the dump preparation operation based on the auxiliary power AP. The dump preparation operation may include an operation of completing an operation being performed in the storage device 200 when the SPO situation occurs in the storage device 200. For example, the operation being performed by the storage device 200 may include the write operation, the read operation, the erase operation, etc.

In operation S130, the storage device 200 may perform the dump operation. The dump operation may include an operation of moving the operation data ODT present in the buffer memory 231 (refer to FIG. 3) to the nonvolatile memory device 210 (refer to FIG. 3). That is, the storage device 200 may perform the PLP procedure through operation S120 and operation S130.

In operation S140, the storage device 200 may save the PLP data DATA_PLP. The PLP data DATA_PLP may include information about the PLP procedure. As described above, in an embodiment, the PLP data DATA_PLP may include information about a time during which each of the CPUs C1 and C2 performs the dump preparation operation. Also, the PLP data DATA_PLP may include information about a point in time when the SPO event occurs and a point in time when each of the CPUs C1 and C2 stops performing the dump preparation operation.

Figure 9:
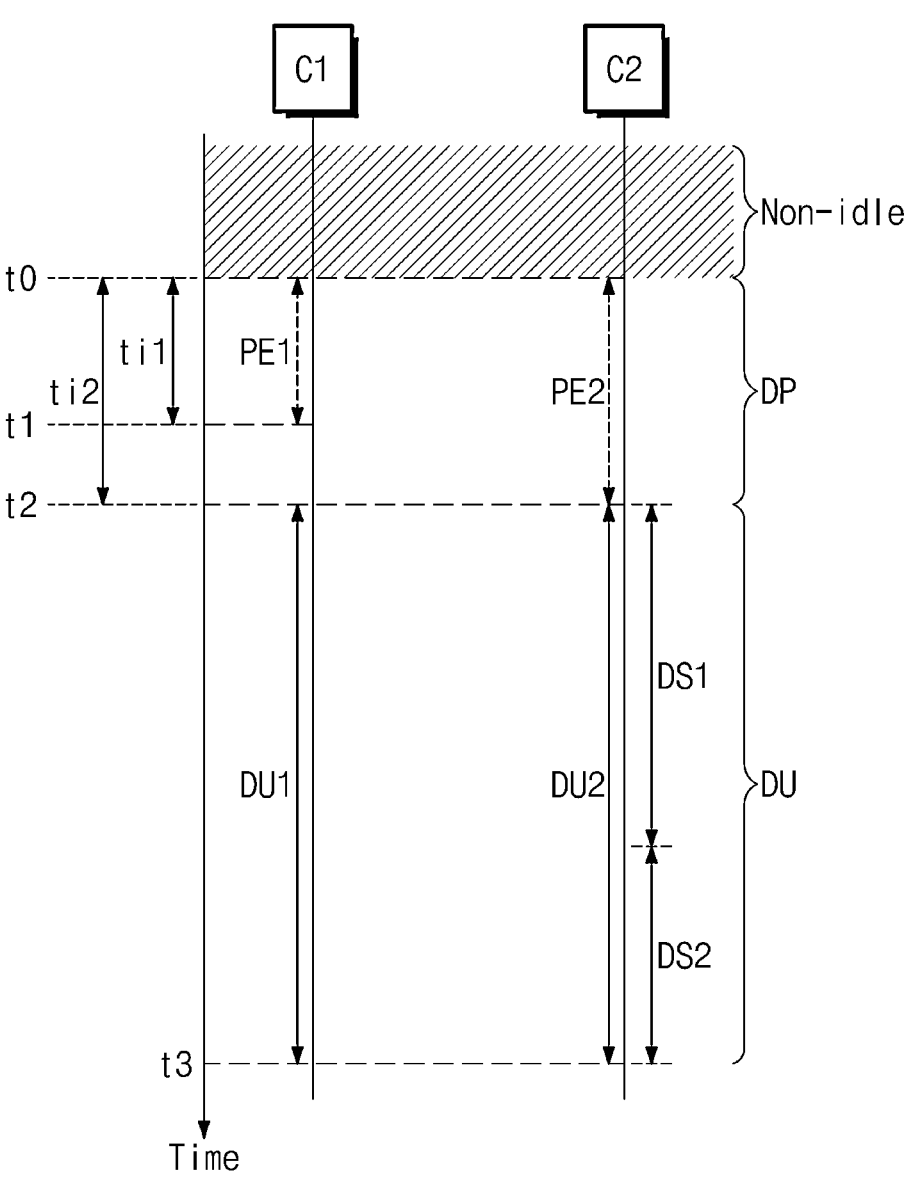
FIG. 9 is a diagram for describing a PLP procedure of a storage device of FIG. 3.

FIG. 9 is a diagram for describing a PLP procedure of a storage device of FIG. 3. FIG. 9 will be described with reference to FIGS. 1 to 8. Referring to FIG. 9, before a 0-th point in time t0, the CPUs C1 and C2 may be in a non-idle state. The non-idle state may mean a state in which each of the CPUs C1 and C2 performs a specific operation in response to the command CMD from a host (e.g., an external host). For example, the specific operation may include the read operation, the write operation, the erase operation, etc.

At the 0-the point in time to, the SPO situation may occur in the storage device 200. In this case, the CPUs C1 and C2 may operate based on the auxiliary power AP from the 0-th point in time t0. The CPUs C1 and C2 may start to perform a dump preparation operation DP from the 0-th point in time t0. The CPUs C1 and C2 may perform the dump preparation operation DP in parallel. The dump preparation operation DP may include pre-operations which are performed before moving the operation data ODT present in the buffer memory 231 (refer to FIG. 3) to the nonvolatile memory device 210. That is, the dump preparation operation DP may be an operation which is performed before backing up the operation data ODT.

The dump preparation operation DP may include a first PLP enter operation PE1 and a second PLP enter operation PE2. The first CPU C1 may perform the first PLP enter operation PE1, and the second CPU C2 may perform the second PLP enter operation PE2.

In an embodiment, the first PLP enter operation PE1 may include an operation of completing the operation being performed by the first CPU C1 at the time of the occurrence of the SPO situation, and the second PLP enter operation PE2 may include an operation of completing the operation being performed by the second CPU C2 at the time of the occurrence of the SPO situation. For example, at the 0-th point in time t0, the first CPU C1 may be in a state of performing a first operation corresponding to a first command CMD from the host (e.g., an external host). In this case, from the 0-th point in time to, the first CPU C1 may perform the first operation based on the auxiliary power AP.

In an embodiment, the first PLP enter operation PE1 may include stopping an operation of the external host of transmitting the command CMD associated with the first CPU C1, and the second PLP enter operation PE2 may include stopping an operation of the external host of transmitting transmits the command CMD associated with the second CPU C2.

In an embodiment, the first PLP enter operation PE1 and the second PLP enter operation PE2 may include an operation of controlling the nonvolatile memory device 210 such that the operation data ODT are stored in the second region R2 of the nonvolatile memory device 210.

At a first point in time t1, the first CPU C1 may complete performing the first PLP enter operation PE1. That is, the first CPU C1 may stop performing the dump preparation operation DP at the first point in time t1. In other words, the first CPU C1 may perform the dump preparation operation DP during the first time interval ti1 from t0 to t1.

At a second point in time t2, the second CPU C2 may complete performing the second PLP enter operation PE2. That is, the second CPU C2 may stop performing the dump preparation operation DP at the second point in time t2. In other words, the second CPU C2 may perform the dump preparation operation DP during the second time interval ti2 from t0 to t2. Also, at the second point in time t2, the dump preparation operation DP of the CPUs C1 and C2 may be completely performed.

That is, a point in time when the dump preparation operation DP performed by the first CPU C1 ends may be different from a point in time when the dump preparation operation DP performed by the second CPU C2 ends.

Meanwhile, the CPUs C1 and C2 may start to perform a dump operation DU at the second point in time t2. The CPUs C1 and C2 may perform the dump operation DU in parallel. The dump operation DU may include a first dump operation DU1 and a second dump operation DU2. For example, the first dump operation DU1 may include an operation of moving a first portion among a plurality of portions of the operation data ODT to the nonvolatile memory device 210. The second dump operation DU2 may include an operation of moving a second portion among the plurality of portions of the operation data ODT to the nonvolatile memory device 210. In an embodiment, the first portion and the second portion may be different from each other. The first CPU C1 may perform the first dump operation DU1, and the second CPU C2 may perform the second dump operation DU2.

Meanwhile, the dump operation DU (e.g., the first dump operation DU1 and/or the second dump operation DU2) may include a first dump step DS1 and a second dump step DS2. For example, the first dump step DS1 may be a step where the CPUs C1 and C2 move user data to the nonvolatile memory device 210, and the second dump step DS2 may be a step where the CPUs C1 and C2 move metadata associated with the user data to the nonvolatile memory device 210. For example, the operation data ODT may include the user data and the metadata described above.

The dump operation DU is illustrated in FIG. 9 as including two steps DS1 and DS2, but the present disclosure is not limited thereto. For example, the dump operation DU may include more steps. In addition, an order of steps DS1 and DS may be changed or performed simultaneously.

Afterwards, at a third point in time t3, the CPUs C1 and C2 may complete performing the dump operation DU. That is, the PLP procedure may be completely performed at the third point in time t3.

In an embodiment, unlike the example illustrated in FIG. 9, the CPUs C1 and C2 may start to perform the dump operation DU after a given time passes from the second point in time t2.

In an embodiment, unlike the example illustrated in FIG. 9, the first CPU C1 may start to perform the dump operation DU at the first point in time t1, and the second CPU C2 may start to perform the dump operation DU at the second point in time t2. The first CPU C1 and the second CPU C2 may start to perform the dump operation DU immediately after the dump preparation operation DP performed by each of the first CPU C1 and the second CPU C2 ends.

As described above, the PLP procedure may include the dump preparation operation DP as well as the dump operation DU of moving the operation data ODT (refer to FIG. 3) present in the buffer memory 231 (refer to FIG. 3) to the nonvolatile memory device 210 (refer to FIG. 3). Accordingly, for the storage simulator 100 (refer to FIG. 1) to accurately determine the capacity of the auxiliary power supply 221 (refer to FIG. 3), there may be a need to consider power consumption caused in the auxiliary power supply 221 (refer to FIG. 3) while the dump preparation operation DP is performed.

As described with reference to FIG. 3, the PLP data DATA_PLP (refer to FIG. 3) may include information about the time interval ti1 during which the first CPU C1 performs the dump preparation operation (e.g., the first PLP enter operation PE1) and the time interval ti2 during which the second CPU C2 performs the dump preparation operation (e.g., the second PLP enter operation PE2). Also, for example, the PLP data DATA_PLP (refer to FIG. 3) may include information about a point in time (e.g., t0) when the SPO situation occurs or is detected, the point in time t1 when the dump preparation operation performed by the first CPU C1 ends, the point in time t2 when the dump preparation operation performed by the second CPU C2 ends. Also, the PLP data DATA_PLP (refer to FIG. 3) may include information about time periods during which dump steps (e.g., DS1 and DS2) are respectively performed in the dump operation DU.

Also, in an embodiment, the PLP data DATA_PLP may include energy consumption information. The energy consumption information may include information about the amount of power consumption caused in the auxiliary power supply 221 (refer to FIG. 3) during the dump preparation operation DP and the amount of power consumption caused in the auxiliary power supply 221 (refer to FIG. 3) at each of the dump steps (e.g., DS1 and DS2) of the dump operation DU.

Figure 10:
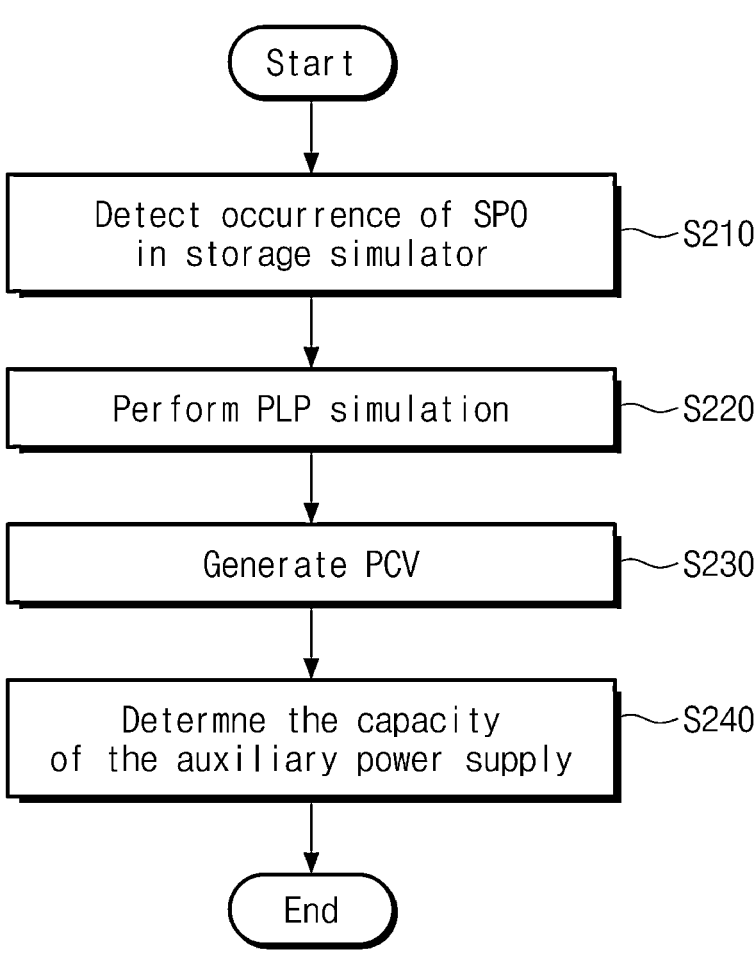
FIG. 10 is a flowchart for describing an operation of a storage simulator of FIG. 2.

FIG. 10 is a flowchart for describing an operation of a storage simulator of FIG. 2. Referring to FIG. 10, in operation S210, the storage simulator 100 may detect the occurrence of the SPO situation. In detail, the storage simulator 100 may detect the occurrence of the SPO situation based on the voltage level of the simulation external power SEP in the storage simulator 100 being lower than the allowable voltage level.

In operation S220, the storage simulator 100 may perform the PLP simulation. In an embodiment, the PLP simulation may include a simulation dump preparation operation SDP and a simulation dump operation SDU. For example, the PLP simulation may include only the simulation dump operation SDU. That is, the PLP simulation may not include the simulation dump preparation operation SDP.

In operation S230, the storage simulator 100 may generate the power consumption value PCV. For example, the power consumption value PCV may indicate power consumption caused in the simulation auxiliary power supply 122a while the PLP simulation is performed. The storage simulator 100 may measure power consumption caused in the simulation auxiliary power supply 122a while the PLP simulation is performed and may generate the power consumption value PCV.

In operation S240, the storage simulator 100 may determine the capacity of the auxiliary power supply 221 (refer to FIG. 6). In detail, for example, based on the power consumption value PCV, the storage simulator 100 may determine the capacity of each of the capacitors 221a (refer to FIG. 6) included in the auxiliary power supply 221 (refer to FIG. 6) and the number of capacitors 221a (refer to FIG. 6).

Figure 11A:
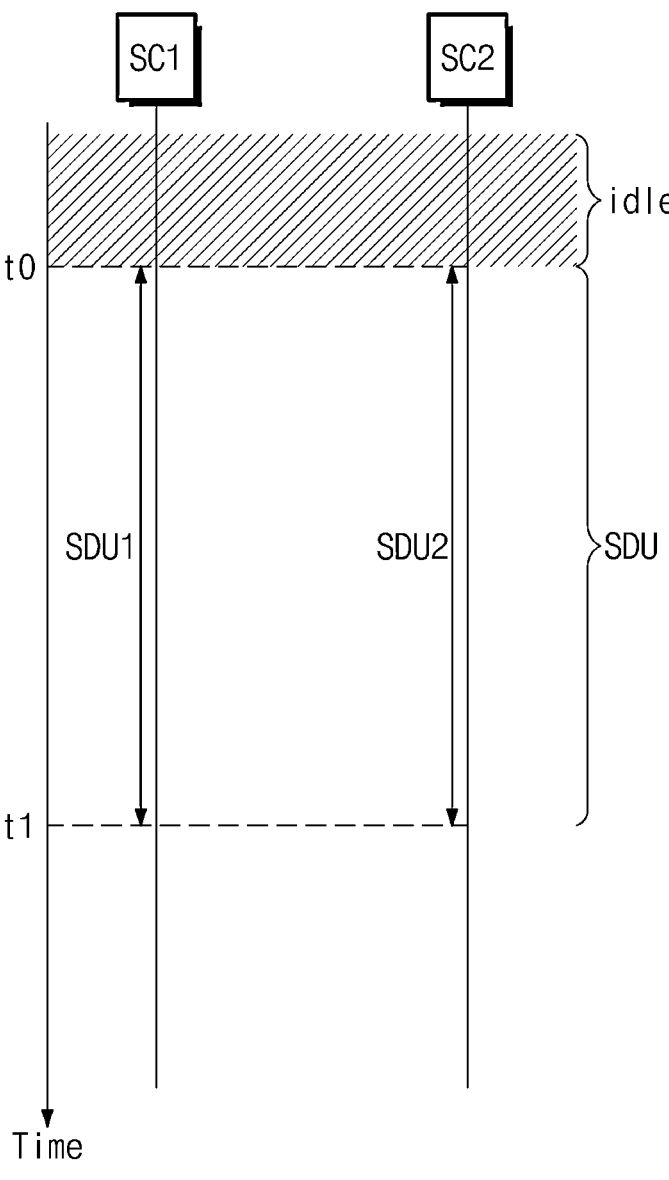

FIGS. 11A and 11B are diagrams for describing an example of an operation of a storage simulator of FIG. 2. In detail, FIG. 11A is a diagram for describing an example of a PLP simulation of the storage simulator 100 (refer to FIG. 2), and FIG. 11B is a diagram for describing an example of an operation of the host 110 and the simulation storage device 120 of FIG. 2.

Referring to FIG. 11A, before a 0-th point in time to, the simulation CPUs SC1 and SC2 may be in an idle state. The idle state may mean a state in which the simulation CPUs SC1 and SC2 does not perform a specific operation in response to the PLP simulation command PSC from the host 110 (refer to FIG. 2). In the idle state, the PLP simulation command PSC may not be received from the host 110 and thus the simulation CPUs SC1 and SC2 does not perform the specific operation according to the PLO simulation command PSCL. For example, the specific operation may include the read operation, the write operation, the erase operation, etc.

At the 0-th point in the time to, the SPO situation may occur. In this case, the simulation CPUs SC1 and SC2 may operate based on the auxiliary power AP from the 0-th point in time t0. Also, the simulation CPUs SC1 and SC2 may start to perform the PLP simulation. As described above, before the 0-th point in time t0, the simulation CPUs SC1 and SC2 may be in the idle state. That is, the simulation CPUs SC1 and SC2 may not perform any operation. Accordingly, the simulation CPUs SC1 and SC2 may start to perform the simulation dump operation SDU from the 0-th point in time to.

The simulation dump operation SDU may correspond to the dump operation DU (refer to FIG. 9). That is, because the simulation CPUs SC1 and SC2 are in the idle state before the SPO situation occurs (e.g., before the 0-th point in time t0), the simulation CPUs SC1 and SC2 may perform the simulation dump operation SDU immediately after the SPO situation occurs.

The simulation dump operation SDU may include an operation of moving the simulation data SDT present in the simulation buffer memory 123a to the simulation nonvolatile memory device 121.

For example, the simulation dump operation SDU may include a first simulation dump operation SDU1 and a second simulation dump operation SDU2. The first simulation dump operation SDU1 may include an operation of moving a first portion of the simulation data SDT to the simulation nonvolatile memory device 121. The second simulation dump operation SDU2 may include an operation of moving a second portion of the simulation data SDT to the simulation nonvolatile memory device 121. In an embodiment, the first portion and the second portion may be different from each other.

The simulation CPUs SC1 and SC2 may perform the simulation dump operation SDU in parallel. The first simulation CPU SC1 may perform the first simulation dump operation SDU1, and the second simulation CPU SC2 may perform the second simulation dump operation SDU2.

At a first point in time t1, the simulation CPUs SC1 and SC2 may complete performing the simulation dump operation SDU. That is, the PLP procedure may be completely performed at the first point in time t1.

Referring to FIG. 11B, the storage simulator 100 may include the host 110 and the simulation storage device 120. The host 110 may correspond to the host 110 of FIG. 2, and the simulation storage device 120 may correspond to the simulation storage device 120 of FIGS. 2 and 4.

Below, an example of an operation of the storage simulator 100 according to one or more example embodiments of the present disclosure will be described.

In a first operation ①, the simulation power manager 122 may supply the simulation nonvolatile memory device 121 and the simulation storage controller 123 with a simulation voltage SV. The simulation voltage SV may be based on the simulation external power SEP (e.g., in a normal situation) or the simulation auxiliary power SAP (e.g., based on the SPO situation).

The simulation power manager 122 may detect the occurrence of the SPO situation based on the voltage level of the simulation external power SEP. In detail, the simulation power manager 122 may detect the occurrence of the SPO situation based on the voltage level of the simulation external power SEP being lower than the allowable voltage level. When the occurrence of the SPO situation is detected, the simulation power manager 122 may supply the simulation voltage SV which is based on the simulation auxiliary power SAP.

In a second operation ②, the simulation power manager 122 may transmit the simulation SPO alert signal SSA to the simulation storage controller 123.

In an embodiment, the first operation ① and the second operation ② may be simultaneously performed.

In a third operation ③, the PLP simulation manager 123b may transmit a dump execution signal DES to the first simulation CPU SC1 and the second simulation CPU SC2. For example, when the dump execution signal DES is received, the first simulation CPU SC1 and the second simulation CPU SC2 may be in the idle state. That is, when the dump execution signal DES is received, the first simulation CPU SC1 and the second simulation CPU SC2 may be in a state of not operating based on the PLP simulation command PSC from the host 110.

In a fourth operation ④, the first simulation CPU SC1 and the second simulation CPU SC2 may perform the simulation dump operation SDU. As described above, when the dump execution signal DES is received, the first simulation CPU SC1 and the second simulation CPU SC2 may be in the idle state. Accordingly, the first simulation CPU SC1 and the second simulation CPU SC2 may perform the simulation dump operation SDU as soon as the dump execution signal DES is received. The first simulation CPU SC1 and the second simulation CPU SC2 may store the simulation data SDT present in the simulation buffer memory 123a in the simulation nonvolatile memory device 121. When the first simulation CPU SC1 and the second simulation CPU SC2 complete storing of the simulation data SDT in the simulation nonvolatile memory device 121, the PLP simulation may end.

As described above, the first simulation CPU SC1 and the second simulation CPU SC2 may only perform the simulation dump operation SDU corresponding to the dump operation DU of FIG. 9 without performing the operation corresponding to the dump preparation operation DP of FIG. 9.

In a fifth operation ⑤, the host 110 may determine the capacity of the auxiliary power supply 221 (refer to FIG. 6). In detail, the host 110 may measure power consumption caused in the simulation auxiliary power supply 122a while the PLP simulation is performed and may generate the power consumption value PCV. The host 110 may determine the capacity of the auxiliary power supply 221 (refer to FIG. 6) based on the power consumption value PCV.

In the example of FIGS. 11A and 11B, the PLP simulation may not include the operation corresponding to the dump preparation operation DP (refer to FIG. 9). That is, the PLP simulation may only include the simulation dump operation SDU corresponding to the dump operation DU (refer to FIG. 9).

That is, in the example of FIGS. 11A and 11B, the power consumption value PCV may not include a value corresponding to the power consumption caused in the auxiliary power supply 221 while the dump preparation operation DP (refer to FIG. 9) is performed.

Accordingly, for example, the host 110 may estimate, through calculation, the value corresponding to the power consumption caused in the auxiliary power supply 221 while the dump preparation operation DP (refer to FIG. 9) is performed and may generate a calculated estimation value. The host 110 may determine the capacity of the auxiliary power supply 221 (refer to FIG. 6) based on the calculated estimation value and the power consumption value PCV.

For example, the calculated estimation value may be generated based on the case where the CPUs C1 and C2 (refer to FIG. 9) simultaneously start the dump preparation operation DP (refer to FIG. 9) and simultaneously end the dump preparation operation DP. However, as described with reference to FIG. 9, a point in time when the dump preparation operation DP (refer to FIG. 9) performed by the CPU C1 (refer to FIG. 9) ends may be different from a point in time when the dump preparation operation DP (refer to FIG. 9) performed by the CPU C2 (refer to FIG. 9) ends. Accordingly, the calculated estimation value may be greater than the maximum amount of power consumption caused in the auxiliary power supply 221 when the dump preparation operation DP (refer to FIG. 9) is actually performed. In this case, the capacity of the auxiliary power supply 221 (refer to FIG. 6) determined based on the calculated estimation value and the power consumption value PCV obtained through the example of FIGS. 11A and 11B may be larger than a capacity that is actually required to perform the PLP procedure.

Figure 12A:
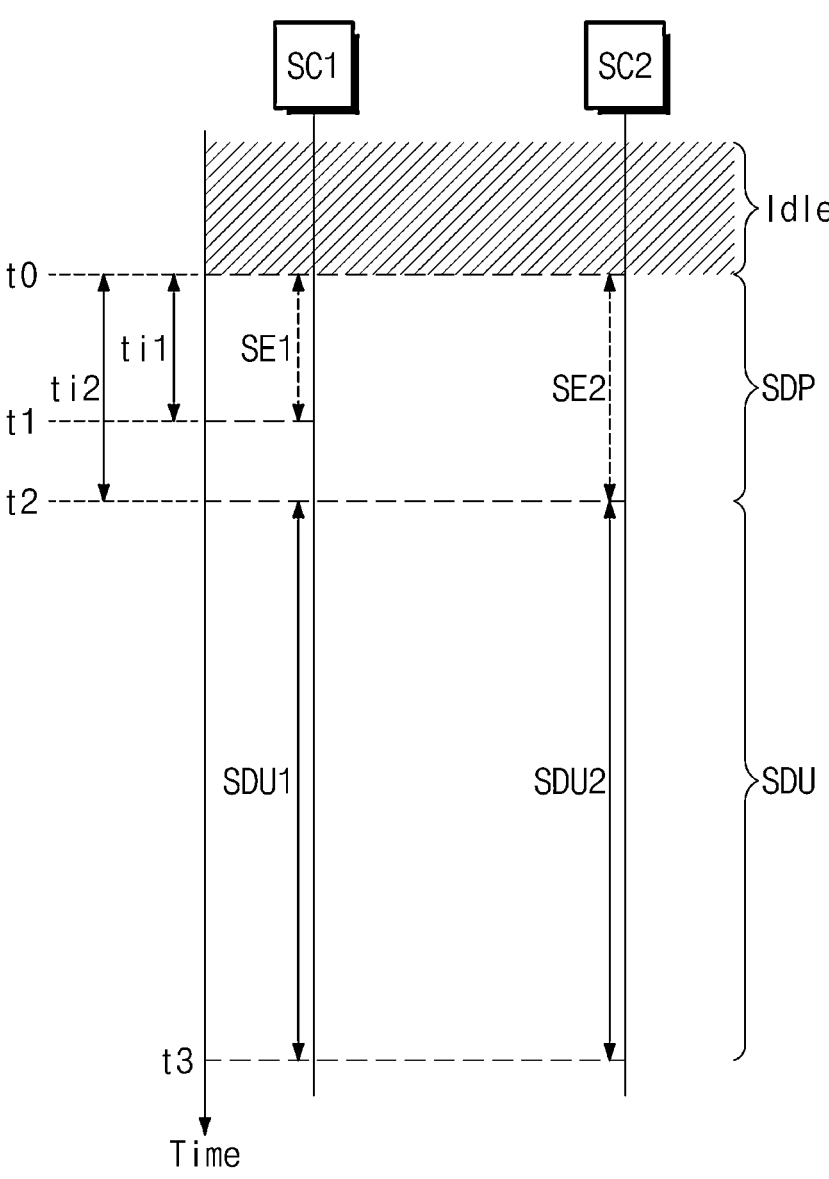
Figure 12B:
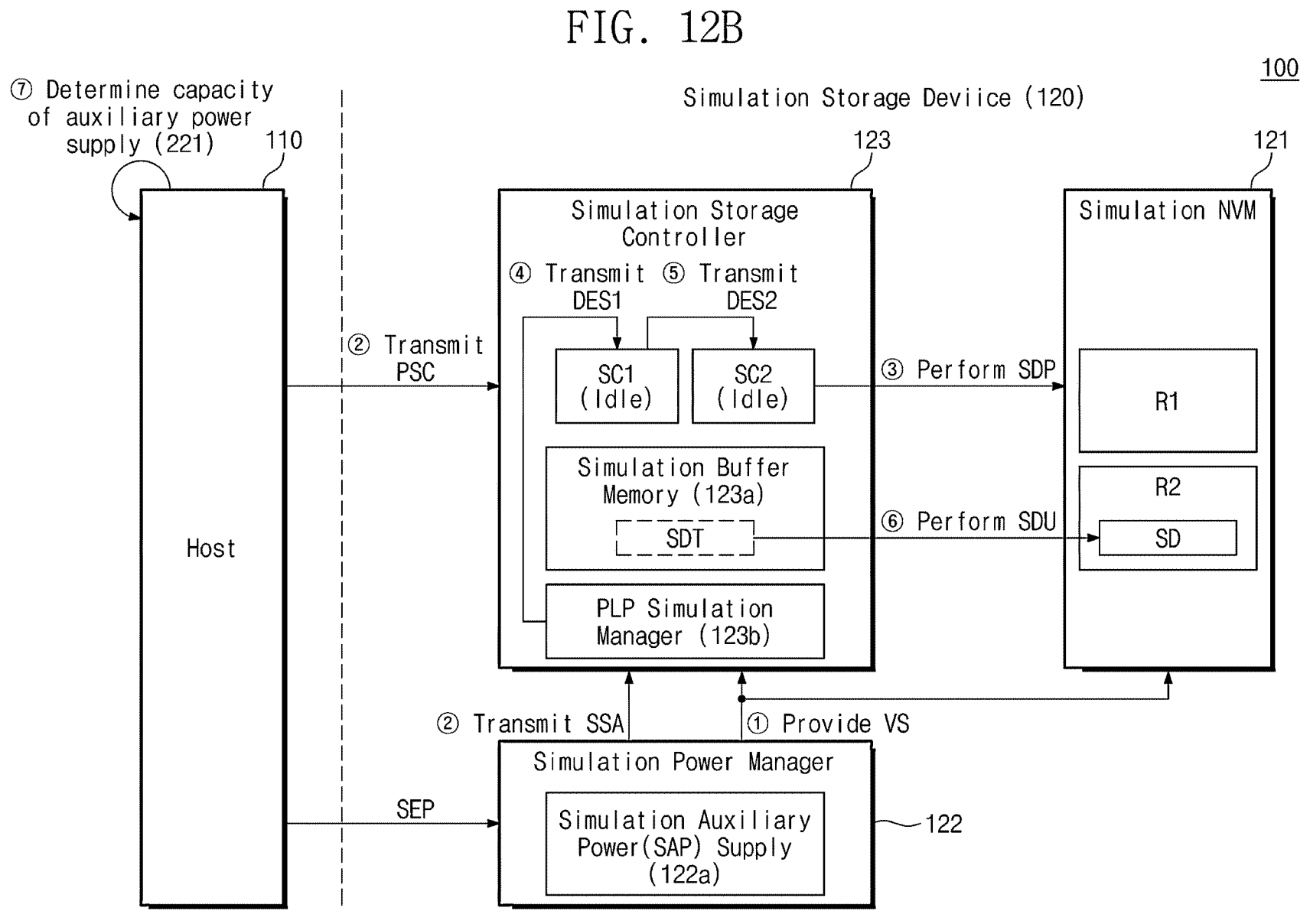

FIGS. 12A and 12B are diagrams for describing an operation of a storage device according to one or more example embodiments of the present disclosure. Referring to FIG. 12A, before a 0-th point in time t0, the simulation CPUs SC1 and SC2 may be in the idle state.

At the 0-th point in time t0, the SPO situation may occur. In this case, the simulation CPUs SC1 and SC2 may operate based on the auxiliary power AP from the 0-th point in time t0. As described above, before the 0-th point in time t0, the simulation CPUs SC1 and SC2 may be in the idle state. However, unlike the example of FIG. 11A, at the 0-th point in time t0, the simulation CPUs SC1 and SC2 may start to perform the simulation dump preparation operation SDP based on the PLP simulation command PSC from the host 110 (refer to FIG. 2).

For example, the simulation CPUs SC1 and SC2 may perform the simulation dump preparation operation SDP in parallel. For example, the simulation dump preparation operation SDP may correspond to the dump preparation operation DP in the storage device 200.

For example, the simulation dump preparation operation SDP may include a first PLP simulation enter operation SE1 and a second PLP simulation enter operation SE2. The first simulation CPU SC1 may perform the first PLP simulation enter operation SE1, and the second simulation CPU SC2 may perform the second PLP simulation enter operation SE2.

In an embodiment, the PLP simulation command PSC may be a command corresponding to the sequential write operation on the simulation nonvolatile memory device 121 (refer to FIG. 4).

In an embodiment, the first PLP simulation enter operation SE1 may include the sequential write operation which the first simulation CPU SC1 performs, and the second PLP simulation enter operation SE2 may include the sequential write operation which the second simulation CPU SC2 performs.

For example, the sequential write operation may be an operation which consumes a larger power than any other operations (e.g., a read operation and an erase operation).

At a first point in time t1, the first simulation CPU SC1 may complete performing the first PLP simulation enter operation SE1. That is, the simulation dump preparation operation SDP performed by the first simulation CPU SC1 may end at the first point in time t1. In this case, the first simulation CPU SC1 may perform the simulation dump preparation operation SDP during the first time interval ti1 from t0 to t1.

At a second point in time t2, the second simulation CPU SC2 may complete performing the second PLP simulation enter operation SE2. That is, the simulation dump preparation operation SDP performed by the second simulation CPU SC2 may end at the second point in time t2. In this case, the second simulation CPU SC2 may perform the simulation dump preparation operation SDP during the second time interval ti2 from t0 to t2.

Meanwhile, the simulation dump preparation operation SDP performed by the first simulation CPU SC1 and the second simulation CPU SC2 may end at the second point in time t2. Accordingly, the simulation CPUs SC1 and SC2 may complete performing the simulation dump preparation operation SDP.

Meanwhile, at the second point in time t2, the simulation CPUs SC1 and SC2 may start to perform the simulation dump operation SDU. The simulation CPUs SC1 and SC2 may perform the simulation dump operation SDU in parallel. As described above, the simulation dump operation may include an operation of moving the simulation data SDT present in the simulation buffer memory 123*a* (refer to FIG. 4) to the simulation nonvolatile memory device 121 (refer to FIG. 4). The simulation dump operation SDU may include the first simulation dump operation SDU1 and the second simulation dump operation SDU2.

For example, the first simulation dump operation SDU1 may include an operation of moving a first portion among a plurality of portions of the simulation data SDT to the simulation nonvolatile memory device 121 (refer to FIG. 4). The second simulation dump operation SDU2 may include an operation of moving a second portion among the plurality of portions of the simulation data SDT to the simulation nonvolatile memory device 121. In an embodiment, the first portion and the second portion may be different from each other.

For example, the first simulation CPU SC1 may perform the first simulation dump operation SDU1, and the second simulation CPU SC2 may perform the second simulation dump operation SDU2.

In an embodiment, at a point in time (e.g., the second point in time t2) to start to perform the simulation dump operation SDU, the simulation buffer memory 123*a* (refer to FIG. 4) may be in a state in which there is no free storage space. That is, the size of the simulation data SDT may be identical to the size of the storage space of the simulation buffer memory 123*a* (refer to FIG. 4). However, this is only an example and the disclosure is not limited thereto.

Afterwards, at a third point in time t3, the simulation CPUs SC1 and SC2 may complete performing the simulation dump operation SDU. That is, the PLP simulation may end at the third point in time t3.

As described above, the PLP simulation according to one or more example embodiments of the present disclosure may include the simulation dump preparation operation SDP corresponding to the dump preparation operation DP (refer to FIG. 9) and the simulation dump operation SDU corresponding to the dump operation DU (refer to FIG. 9). Accordingly, unlike the case of FIG. 11A, the storage simulator 100 may determine the capacity of the auxiliary power supply 221 by measuring power consumption caused in the simulation auxiliary power supply 122*a* while the PLP simulation including the simulation dump preparation operation SDP is performed.

Meanwhile, as described above, the first simulation CPU SC1 may perform the simulation dump preparation operation SDP during the first time interval ti1 from t0 to t1, and the second simulation CPU SC2 may perform the simulation dump preparation operation SDP during the second time interval ti2 from t0 to t2.

The storage simulator 100 according to one or more example embodiments of the present disclosure may control the PLP simulation. For example, the storage simulator 100 may control the first time interval ti1 and the second time interval ti2. That is, the storage simulator 100 may control a time period during which each of the simulation CPUs SC1 and SC2 performs the simulation dump preparation operation SDP. Also, the storage simulator 100 may control the PLP simulation command PSC. For example, during the time when the simulation dump preparation operation SDP is performed, the storage simulator 100 may control a kind of an operation which each of the simulation CPUs SC1 and SC2 performs.

In an embodiment, a length of the first time interval ti1 and a length of the second time interval ti2 may have values determined in advance.

In an embodiment, the storage simulator 100 may control the PLP simulation based on the PLP data DATA_PLP (refer to FIG. 3) generated before the PLP simulation is performed.

In an embodiment, the storage simulator 100 may determine a time during which each of the simulation CPUs SC1 and SC2 is to perform the simulation dump preparation operation SDP, based on the PLP data DATA_PLP (refer to FIG. 3) generated before the PLP simulation is performed. For example, the storage simulator 100 may determine the length of the first time interval ti1 and the length of the second time interval ti2 based on the PLP data DATA_PLP (refer to FIG. 3) generated before the PLP simulation is performed.

In an embodiment, the storage simulator 100 may determine a kind of an operation which each of the simulation CPUs SC1 and SC2 is to perform during the simulation dump preparation operation SDP, based on the PLP data DATA_PLP (refer to FIG. 3) generated before the PLP simulation is performed. For example, based on the PLP data DATA_PLP (refer to FIG. 3) generated before the PLP simulation is performed, the storage simulator 100 may control the first simulation CPU SC1 such that the sequential write operation is performed during the first time interval ti1 and may control the second simulation CPU SC2 such that the sequential write operation is performed during the second time interval ti2.

In other words, the storage simulator 100 according to one or more example embodiments of the present disclosure may control the time (e.g., the first time interval ti1) during which the simulation CPU SC1 performs the simulation dump preparation operation SDP and the time (e.g., the second time interval ti2) during which the simulation CPU SC2 performs the simulation dump preparation operation SDP. Also, the storage simulator 100 may control a kind of an operation which each of the simulation CPUs SC1 and SC2 performs during the simulation dump preparation operation SDP.

As described above, the sequential write operation may be an operation whose power consumption is larger than that of any other operations. For example, the storage simulator 100 may control the first simulation CPU SC1 such that the sequential write operation is performed during the first time interval ti1 and may control the second simulation CPU SC2 such that the sequential write operation is performed during the second time interval ti2. Accordingly, the storage simulator 100 may perform the simulation dump preparation operation SDP which implements the case where the storage device 200 consumes a maximum of power when the dump preparation operation DP is performed.

Meanwhile, the storage simulator 100 may perform the simulation dump operation SDU in a state in which the simulation buffer memory 123a (refer to FIG. 4) is full due to the simulation data SDT (e.g., in a state in which a free storage space is absent from the simulation buffer memory 123a (refer to FIG. 4)). As the size of the simulation data SDT increases, power consumption caused when the simulation dump operation SDU is performed may increase. That is, the storage simulator 100 may perform the simulation dump operation SDU which implements the case where the storage device 200 consumes a maximum of power when the dump operation DU is performed.

According to the above description, the storage simulator 100 may perform the PLP simulation which implements the PLP procedure that causes a maximum of power consumption in the auxiliary power supply 221 of the storage device 200.

Referring to FIG. 12B, the storage simulator 100 may include the host 110 and the simulation storage device 120. The host 110 may correspond to the host 110 of FIG. 2, and the simulation storage device 120 may correspond to the simulation storage device 120 of FIGS. 2 and 4.

Below, an example of an operation of the storage simulator 100 according to one or more example embodiments of the present disclosure will be described.

In a first operation ①, the simulation power manager 122 may supply the simulation nonvolatile memory device 121 and the simulation storage controller 123 with the simulation voltage SV. The simulation voltage SV may be based on the simulation external power SEP (e.g., in a normal situation) or the simulation auxiliary power SAP (e.g., based on the SPO situation).

In a second operation ②, the simulation power manager 122 may transmit the simulation SPO alert signal SSA to the simulation storage controller 123. The simulation power manager 122 may detect the occurrence of the SPO situation based on the voltage level of the simulation external power SEP (e.g., based on the voltage level of the simulation external power SEP being lower than the allowable voltage level). Also, the host 110 may transmit the PLP simulation command PSC to the simulation CPUs SC1 and SC2.

In an embodiment, the first operation ① and the second operation ② may be simultaneously performed.

In a third operation ③, the simulation CPUs SC1 and SC2 may perform the simulation dump preparation operation SDP based on the PLP simulation command PSC. As described with reference to FIG. 12A, the simulation dump preparation operation SDP may include the first PLP simulation enter operation SE1 and the second PLP simulation enter operation SE2. Also, the first simulation CPU SC1 may perform the first PLP simulation enter operation SE1, and the second simulation CPU SC2 may perform the second PLP simulation enter operation SE2. That is, according to the embodiment of FIG. 12B, the simulation CPUs SC1 and SC2 may perform the simulation dump preparation operation SDP corresponding to the dump preparation operation DP.

In an embodiment, the first PLP simulation enter operation SE1 and the second PLP simulation enter operation SE2 may be both the sequential write operation on the simulation nonvolatile memory device 121.

In an embodiment, the first PLP simulation enter operation SE1 may be the sequential write operation on the simulation nonvolatile memory device 121, and the second PLP simulation enter operation SE2 may be the erase operation on the simulation nonvolatile memory device 121.

In an embodiment, the first PLP simulation enter operation SE1 and the second PLP simulation enter operation SE2 may be both the erase operation on the simulation nonvolatile memory device 121. However, the disclosure is not limited to the above examples and the kinds of the first PLP simulation enter operation SE1 and the second PLP simulation enter operation SE2 may be variously determined.

In a fourth operation ④, the PLP simulation manager 123b may transmit a first dump execution signal DES1 to the first simulation CPU SC1. The first simulation CPU SC1 may terminate the execution of the first PLP simulation enter operation SE1 in response to the first dump execution signal DES1. That is, the first simulation CPU SC1 may terminate the execution of the simulation dump preparation operation SDP.

In a fifth operation ⑤, the first simulation CPU SC1 may transmit a second dump execution signal DES2 to the second simulation CPU SC2. The second simulation CPU SC2 may terminate the execution of the second PLP simulation enter operation SE2 in response to the second dump execution signal DES2. That is, the second simulation CPU SC2 may terminate the execution of the simulation dump preparation operation SDP.

In an embodiment, the first dump execution signal DES1 may include information about a point in time when the SPO situation occurs and information about an execution time of the second PLP simulation enter operation SE2. When the execution time of the second PLP simulation enter operation SE2 passes from the point in time when the SPO situation occurs, the first simulation CPU SC1 may transmit the second dump execution signal DES2 to the second simulation CPU SC2.

As described above, the storage simulator 100 may control the timing to transmit the dump execution signals DES1 and DES2 to the simulation CPUs SC1 and SC2, respectively. Accordingly, the storage simulator 100 may control the time during which each of the simulation CPUs SC1 and SC2 performs the simulation dump preparation operation SDP.

In a sixth operation ⑥, the first simulation CPU SC1 and the second simulation CPU SC2 may perform the simulation dump operation SDU. The first simulation CPU SC1 and the second simulation CPU SC2 may store the simulation data SDT present in the simulation buffer memory 123a in the simulation nonvolatile memory device 121. As the first simulation CPU SC1 and the second simulation CPU SC2 complete storing the simulation data SDT in the simulation nonvolatile memory device 121, the PLP simulation may end.

In a seventh operation 7, the host 110 may determine the capacity of the auxiliary power supply 221 (refer to FIG. 6). In detail, the host 110 may measure power consumption caused in the simulation auxiliary power supply 122a while the PLP simulation is performed and may generate the power consumption value PCV. The host 110 may determine the capacity of the auxiliary power supply 221 (refer to FIG. 6) based on the power consumption value PCV.

As described above, in the example of FIGS. 12A and 12B, the PLP simulation may include the simulation dump preparation operation SDP corresponding to the dump preparation operation DP (refer to FIG. 9) and the simulation dump operation SDU corresponding to the dump operation to FIG. 9 DU (refer to FIG. 9). Also, the PLP simulation may implement the PLP procedure which consumes a maximum of power. Accordingly, the power consumption value PCV may correspond to the maximum amount of power consumption that may be caused while the PLP procedure is performed. This may mean that the capacity of the auxiliary power supply 221 determined by the storage simulator 100 is sufficient to perform the PLP procedure and is not large enough to affect the circuitry of the storage device 200.

Figure 13:
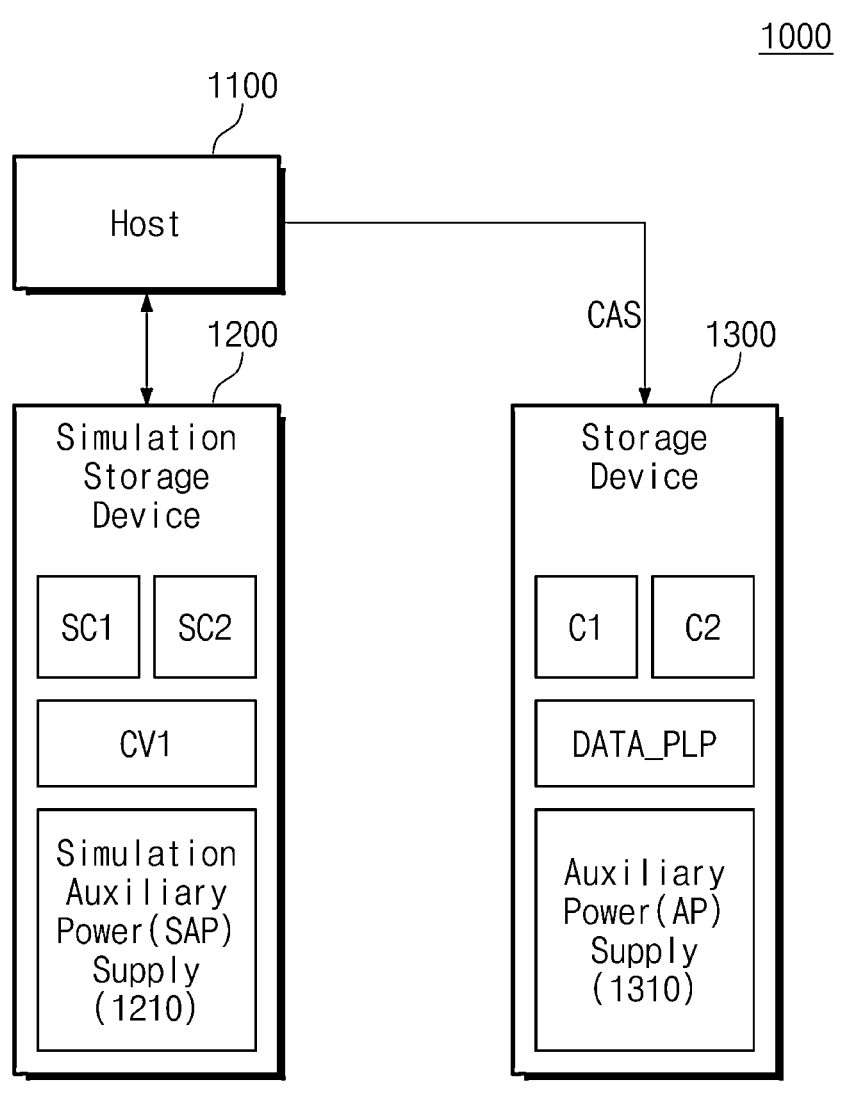
FIG. 13 is a diagram for describing a simulation system according to one or more example embodiments of the present disclosure.

FIG. 13 is a diagram for describing a simulation system 1000 according to one or more example embodiments of the present disclosure. Referring to FIG. 13, the simulation system 1000 may include a host 1100, a simulation storage device 1200, and a storage device 1300. The host 1100 may correspond to the host 110 of FIG. 2, the simulation storage device 1200 may correspond to the simulation storage device 120 of FIG. 2, and the storage device 1300 may correspond to the storage device 200 of FIG. 1. The host 110 and the simulation storage device 1200 may correspond to the storage simulator 100 including the host 110 and the simulation storage device 120 in FIG. 2.

In an embodiment, the storage device 1300 may perform a first PLP procedure in the SPO situation under control of the host 1100. The first PLP procedure may be the same or similar to that described with reference to FIGS. 8 and 9. For example, in the first PLP procedure, the first CPU C1 may perform the dump preparation operation DP during a first time interval, and the second CPU C2 may perform the dump preparation operation DP during a second time interval. The storage device 1300 may generate and store first PLP data DATA_PLP including the first time interval and the second time interval.

Meanwhile, after the first PLP procedure ends, the simulation storage device 1200 may perform the first PLP simulation in the SPO situation under control of the host 1100. The first PLP simulation may be the same or similar to that described with reference to FIGS. 12A and 12B. In the first PLP simulation, the first simulation CPU SC1 may perform the simulation dump preparation operation SDP (refer to FIG. 12A) during a third time interval, and the second simulation CPU SC2 (refer to FIG. 12A) may perform the simulation dump preparation operation SDP during a fourth time interval.

In an embodiment, the length of the third time interval may be determined based on the first time interval, and the length of the fourth time interval may be determined based on the second time interval. That is, the length of the third time interval and the length of the fourth time interval may be determined based on the first PLP data DATA_PLP generated before the first PLP simulation is performed.

The host 1100 may generate a first capacity value CV1 indicating the appropriate capacity of an auxiliary power supply 1310 based on the first PLP simulation. In detail, the host 1100 may generate a power consumption value by measuring power consumption caused in a simulation auxiliary power supply 1210 while the first PLP simulation is performed and may generate the first capacity value CV1 based on the power consumption value.

Meanwhile, after the first PLP simulation ends, the storage device 1300 may perform a second PLP procedure under control of the host 1100. For example, in the second PLP procedure, the first CPU C1 may perform the dump preparation operation DP during a fifth time interval, and the second CPU C2 may perform the dump preparation operation DP during a sixth time interval. The storage device 1300 may generate and store second PLP data DATA_PLP including the fifth time interval and the sixth time interval.

In an embodiment, the host 1100 may check the second PLP data DATA_PLP. For example, based on the second PLP data DATA_PLP, the host 1100 may determine whether the first capacity value CV1 is sufficient as the capacity of the auxiliary power supply 1310. Also, the host 1100 may revise the PLP simulation based on the second PLP data DATA_PLP. For example, in the above example, the fifth time interval may be longer than the third time interval, and the sixth time interval may be longer than the fourth time interval. In this case, the host 1100 may determine that the first capacity value CV1 is not sufficient as the capacity of the auxiliary power supply 1310. Accordingly, the host 1100 may adjust the first PLP simulation. Afterwards, the storage device 1300 may perform a second PLP simulation under control of the host 1100. In the second PLP simulation, the first simulation CPU SC1 may perform the simulation dump preparation operation SDP (refer to FIG. 12A) during the fifth time interval, and the second simulation CPU SC2

(refer to FIG. 12A) may perform the simulation dump preparation operation SDP during the sixth time interval.

In an embodiment, the host 1100 may check the second PLP data DATA_PLP. For example, the capacity of the auxiliary power supply 1310 may be confirmed as the first capacity value CV1 if the first capacity value CV1 is determined as being sufficient. If the first capacity value CV1 is determined as not being sufficient, a new capacity value of the auxiliary power supply 1310 may be stored as the first capacity value CV1. Also, for example, in the above example, the fifth time interval may be shorter than the third time interval, and the sixth time interval may be shorter than the fourth time interval. In this case, the host 1100 may transmit a capacity analysis signal CAS to the storage device 1300. The capacity analysis signal CAS may include information indicating that the capacity of the auxiliary power supply 1310 is sufficient to perform the PLP procedure. In an embodiment, based on receiving the capacity analysis signal CAS, the storage device 1300 may consume a larger power in a next PLP procedure to complete the PLP procedure quickly.

The simulation system 1000 according to one or more example embodiments of the present disclosure may perform the PLP simulation in an environment which is substantially identical to the environment where the PLP procedure of the storage device 1300 is performed. In this case, the PLP simulation may include the simulation dump preparation operation corresponding to the dump preparation operation as well as the simulation dump operation corresponding to the dump operation. Accordingly, the simulation system 1000 may determine the appropriate capacity of the auxiliary power supply 1310 more accurately. Also, the simulation system 1000 may improve the accuracy of simulation by revising the PLP simulation based on the PLP data DATA_PLP obtained in the actual operation process.

According to embodiments of the present disclosure, a PLP simulation may be performed in an environment implemented to be identical to an environment where a storage device performs a PLP procedure. The PLP simulation may include an operation corresponding to a dump preparation operation performed before data backup in the PLP procedure. Accordingly, the capacity of an auxiliary power supply may be estimated more accurately by measuring power consumption caused while the simulation is performed.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the present disclosure has been described with reference to example embodiments thereof, it will be apparent to those of ordinary skill in the art that various changes and modifications may be made thereto without departing from the spirit and scope of the present disclosure as set forth in the following claims and their equivalents.

What is claimed is:

1. A simulation system comprising:
   a storage device including an auxiliary power supply configured to generate an auxiliary power, the storage device being configured to, based on detecting a sudden power-off (SPO) event, perform a power loss protection (PLP) procedure associated with backing up operation data based on the auxiliary power; and
   a storage simulator including a first simulation central processing unit (CPU) and a second simulation CPU, the storage simulator being configured to, based on detecting the SPO event, perform a PLP simulation corresponding to the PLP procedure, configured to generate a power consumption value by measuring an amount of power consumed while the PLP simulation is performed, and configured to determine a capacity of the auxiliary power supply based on the power consumption value,
   wherein the PLP procedure includes a dump preparation operation performed before the operation data are backed up,
   wherein the PLP simulation includes a simulation dump preparation operation associated with the dump preparation operation, and
   wherein the first simulation CPU and the second simulation CPU are configured to perform the simulation dump preparation operation and terminate performing the simulation dump preparation operation at different points in time.

2. The simulation system of claim 1, wherein the dump preparation operation includes an operation of completing an operation being performed by the storage device when the SPO event occurs in the storage device.

3. The simulation system of claim 1, wherein the storage simulator is further configured to:
   control the first simulation CPU to perform the simulation dump preparation operation during a first time interval from a first point in time; and
   control the second simulation CPU to perform the simulation dump preparation operation during a second time interval, which is different from the first time interval, from the first point in time.

4. The simulation system of claim 3, wherein the storage device is further configured to generate first PLP data associated with the PLP procedure performed by the storage device before the PLP simulation is performed, and
   wherein the storage simulator is further configured to determine a length of the first time interval and a length of the second time interval based on the first PLP data.

5. The simulation system of claim 4, wherein the storage device is further configured to generate second PLP data associated with the PLP procedure performed by the storage device after the PLP simulation is performed, and wherein the storage simulator is further configured to determine whether the capacity of the auxiliary power supply is sufficient to perform the PLP procedure, based on the second PLP data.

6. The simulation system of claim 1, wherein the storage simulator further includes:

a simulation auxiliary power supply configured to generate a simulation auxiliary power, wherein the storage simulator is further configured to, based on detecting the SPO event, operate based on the simulation auxiliary power, and wherein the power consumption value includes a first measurement value indicating an amount of power consumed in the simulation auxiliary power supply while the simulation dump preparation operation is performed.

7. The simulation system of claim 6, wherein the PLP simulation further includes a simulation dump operation of backing up simulation data, the simulation data corresponding to the operation data, and wherein the power consumption value further includes a second measurement value indicating an amount of power consumed in the simulation auxiliary power supply while the simulation dump operation is performed.

8. The simulation system of claim 3, wherein the storage simulator further includes a simulation storage device corresponding to the storage device, and wherein the simulation storage device includes:

a simulation nonvolatile memory device; and a simulation storage controller including the first simulation CPU and the second simulation CPU and configured to control the simulation nonvolatile memory device.

9. The simulation system of claim 8, wherein the simulation dump preparation operation includes at least one of a sequential write operation on the simulation nonvolatile memory device or an erase operation on the simulation nonvolatile memory device.

10. The simulation system of claim 8, wherein the simulation storage controller further includes a simulation buffer memory configured to store simulation data corresponding to the operation data, wherein the PLP simulation further includes a simulation dump operation of backing up the simulation data, and wherein the simulation dump operation includes an operation of moving the simulation data from the simulation buffer memory to the simulation nonvolatile memory device.

11. The simulation system of claim 10, wherein, in performing the simulation dump operation, a size of the simulation data is identical to a size of a storage space of the simulation buffer memory.

12. The simulation system of claim 1, wherein the storage device includes a first CPU and a second CPU each configured to perform the dump preparation operation, wherein the first CPU is configured to terminate performing the dump preparation operation at a first point in time, and wherein the second CPU is configured to terminate performing the dump preparation operation at a second point in time different from the first point in time.

13. The simulation system of claim 12, wherein the storage device is further configured to generate PLP data including information about the first point in time and the second point in time, and configured to store the PLP data.

14. The simulation system of claim 13, wherein the PLP procedure further includes a dump operation of backing up the operation data after an execution of the dump preparation operation is completed, wherein the dump operation includes a plurality of dump steps, and wherein the PLP data further includes information about an amount of power consumed in the auxiliary power supply while each of the dump preparation operation and the plurality of dump steps is performed.

15. A simulation system comprising:

a storage device including an auxiliary power supply configured to generate an auxiliary power, the storage device being configured to, based on detecting a sudden power-off (SPO) event, perform a power loss protection (PLP) procedure associated with backing up operation data based on the auxiliary power, and configured to store PLP data associated with the PLP procedure; and a storage simulator configured to, based on detecting the SPO event, perform a PLP simulation corresponding to the PLP procedure by using the PLP data, configured to generate a power consumption value by measuring an amount of power consumed while the PLP simulation is performed, and configured to determine a capacity of the auxiliary power supply based on the power consumption value, wherein the PLP procedure includes a dump preparation operation performed before the operation data are backed up, and wherein the PLP simulation includes a simulation dump preparation operation associated with the dump preparation operation that causes a maximum of power consumption in the auxiliary power supply.

16. The simulation system of claim 15, wherein the dump preparation operation includes an operation of completing an operation being performed by the storage device when the SPO event occurs in the storage device.

17. The simulation system of claim 16, wherein the storage simulator includes a first simulation central processing unit (CPU) and a second simulation CPU configured to perform the simulation dump preparation operation in parallel, and wherein the storage simulator is configured to:

control the first simulation CPU to perform the simulation dump preparation operation during a first time interval from a first point in time; and control the second simulation CPU to perform the simulation dump preparation operation during a second time interval from the first point in time.

18. The simulation system of claim 17, wherein the storage simulator is further configured to determine a length of the first time interval and a length of the second time interval based on the PLP data generated before the PLP simulation is performed.

19. The simulation system of claim 16, wherein the storage simulator includes a simulation auxiliary power supply configured to generate a simulation auxiliary power, wherein the storage simulator is further configured to, based on detecting the SPO event, operate based on the simulation auxiliary power, and wherein the power consumption value includes a value indicating an amount of power consumed in the simulation auxiliary power supply while the simulation dump preparation operation is performed.

20. A simulation system comprising:

a storage simulator; and a storage device, wherein the storage device includes an auxiliary power supply configured to generate an auxiliary power, wherein the storage device is configured to, based on detecting a sudden power-off (SPO) event in the storage device, perform a power loss protection (PLP) procedure associated with backing up operation data based on the auxiliary power, wherein the storage simulator includes a simulation auxiliary power supply configured to generate a simulation auxiliary power, wherein the storage simulator is configured to:

perform, based on detecting the SPO event in the storage simulator, a PLP simulation corresponding to the PLP procedure;

generate a power consumption value by measuring an amount of power consumed in the simulation auxiliary power supply while the PLP simulation is performed; and determine a first capacity of the auxiliary power supply based on the power consumption value, wherein the storage device is further configured to, after the PLP simulation, perform another PLP procedure and generate PLP data associated with the another PLP procedure, wherein the storage simulator is further configured to determine whether the first capacity is sufficient to perform the another PLP procedure, based on the PLP data, wherein the PLP procedure includes a dump preparation operation performed before the operation data are backed up, and wherein the PLP simulation includes a simulation dump preparation operation associated with the dump preparation operation.

* * * * *